(12) United States Patent
Higashimata et al.

(10) Patent No.: US 6,405,120 B1
(45) Date of Patent: Jun. 11, 2002

(54) VEHICULAR VELOCITY CONTROLLING APPARATUS AND METHOD TO FOLLOW UP A PRECEDING VEHICLE RUNNING AHEAD OF VEHICLE

(75) Inventors: Akira Higashimata; Takenori Hashizume, both of Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/573,187

(22) Filed: May 19, 2000

(30) Foreign Application Priority Data

May 20, 1999 (JP) .......................................... 11-140717
May 20, 1999 (JP) .......................................... 11-140718

(51) Int. Cl.⁷ ............................................. B60K 31/00
(52) U.S. Cl. ............................. 701/96; 701/95; 701/51; 180/170
(58) Field of Search .............................. 701/96, 93, 94, 701/95, 53, 51, 65; 180/170, 179

(56) References Cited

U.S. PATENT DOCUMENTS

| | | | | |
|---|---|---|---|---|
| 4,648,291 A | * | 3/1987 | Klatt et al. ............... 74/866 |
| 5,038,880 A | * | 8/1991 | Matsuoka et al. ........ 180/179 |
| 5,396,426 A | * | 3/1995 | Hibino et al. .......... 364/426.04 |
| 5,611,748 A | | 3/1997 | Kashiwabara |
| 5,618,243 A | * | 4/1997 | Kondo et al. ............ 477/118 |
| 5,669,850 A | | 9/1997 | Dourra et al. |
| 5,752,214 A | * | 5/1998 | Minowa et al. ........... 701/111 |
| 5,902,345 A | * | 5/1999 | Minowa et al. ........... 701/96 |
| 5,959,572 A | | 9/1999 | Higashimata et al. ..... 342/70 |
| 6,098,002 A | * | 8/2000 | Horiguchi et al. ........ 701/51 |
| 6,154,168 A | * | 11/2000 | Egawa et al. ............. 342/71 |
| 6,216,082 B1 | * | 4/2001 | Minowa et al. ........... 701/96 |
| 6,220,986 B1 | * | 4/2001 | Aruga et al. ............. 477/97 |

FOREIGN PATENT DOCUMENTS

| | | |
|---|---|---|
| JP | 7-223457 | 8/1995 |
| JP | 10184899 | 7/1998 |
| JP | 11-151952 | 6/1999 |

* cited by examiner

Primary Examiner—Michael J. Zanelli
Assistant Examiner—Eric M Gibson
(74) Attorney, Agent, or Firm—Foley & Lardner

(57) ABSTRACT

In vehicular velocity controlling method and apparatus, an inter-vehicle distance from the vehicle to another vehicle which is running ahead of the vehicle is detected, a target vehicular velocity to make a detected value of the inter-vehicle distance substantially equal to a target inter-vehicle distance is calculated, a vehicular velocity of the vehicle is detected, a target vehicular driving force to make a detected value of the vehicular velocity substantially equal to the target vehicular velocity is detected, a gradient of a descending slope on which the vehicle is running is detected, a driving force exerted by a rotary driving force source and a gear position of a vehicular transmission are controlled and simultaneously a brake force exerted by a vehicular brake system if the target driving force is negative on the basis of the calculated target driving force is controlled, and a limitation on a shift of the gear position of the vehicular transmission even under an establishment of a gear position shift condition in accordance with the road surface gradient is placed.

17 Claims, 11 Drawing Sheets

FOURTH-SPEED

THIRD-SPEED

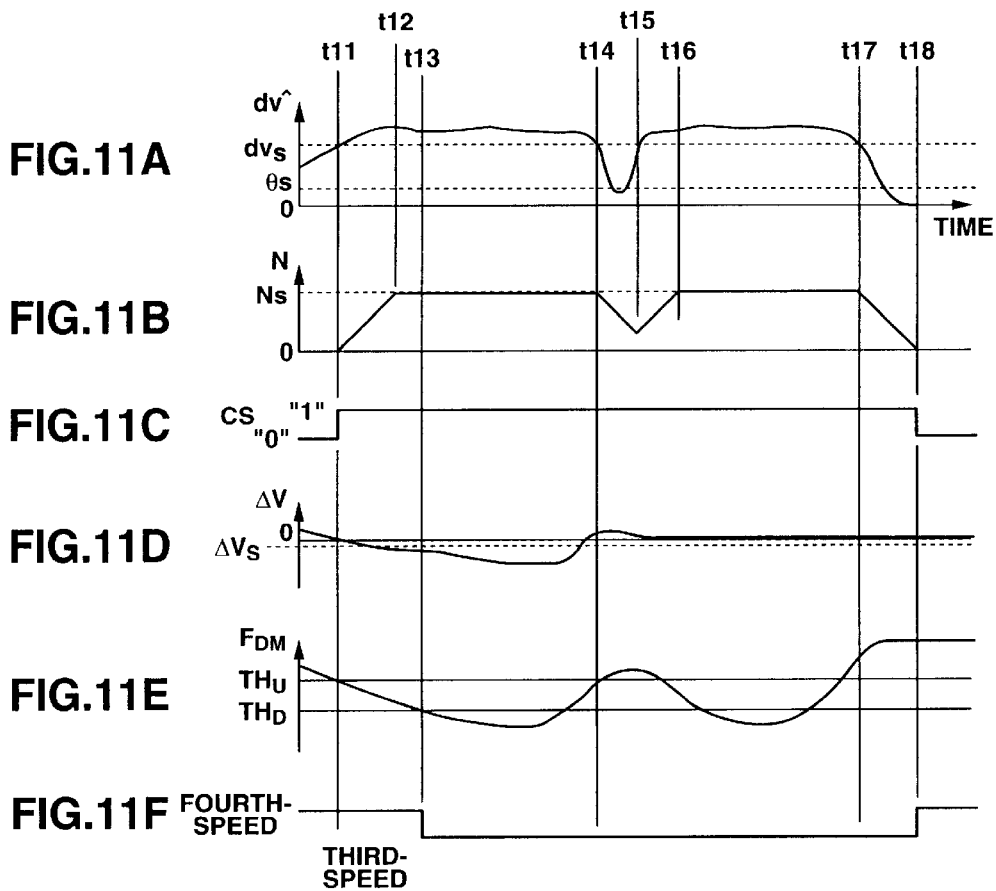
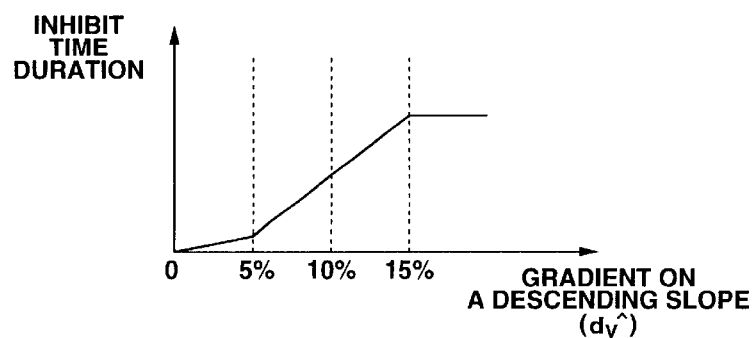

VEHICULAR VELOCITY CONTROLLING APPARATUS AND METHOD TO FOLLOW UP A PRECEDING VEHICLE RUNNING AHEAD OF VEHICLE

BACKGROUND OF THE INVENTION a) Field of the Invention

The present invention relates to vehicular velocity controlling apparatus and method to follow up a preceding vehicle which is running ahead of the vehicle with an appropriate inter-vehicle distance maintained.

b) Description of the Related Art

A Japanese Patent Application First Publication No. Heisei 7-223457 published on Aug. 22, 1995 exemplifies a previously proposed vehicular velocity controlling apparatus.

In the previously proposed vehicular velocity controlling apparatus, down shift conditions to make a gear ratio of a vehicular transmission down shift (shift down) generally set according to any one of an inter-vehicle distance of the vehicle to a preceding vehicle which is running ahead of the vehicle, the inter-vehicle distance and a vehicular velocity, and the inter-vehicle distance and a relative velocity of the vehicle to the preceding vehicle are individually and separately set depending on whether the vehicle is running on a flat road surface, a descending slope (so-called, down-hill), or an ascending slope(up-hill), thus an appropriate inter-vehicle distance being always enabled to be maintained.

SUMMARY OF THE INVENTION

In the previously proposed vehicular velocity controlling apparatus described in the above-identified Japanese Patent Application First Publication, a controller determines on which type of a road surface the vehicle is running, viz., a flat road, an ascending slope, or a descending slope and sets an down shift condition of a gear shift position of a vehicular transmission without consideration of a road surface gradient but with a use of empirically determined or experimentally determined map.

Hence, an appropriate timing of the down shift operation in the vehicular transmission in response to an actual road surface gradient and a vehicular running condition would not be achieved and a disagreeable feeling (a mismatch to a driver's maneuver) has occurred to the vehicular driver.

To solve the above-described inconvenience, it may be considered that a map (a database table) covering every road surface and every vehicle running condition needs to be generated. However, a tremendous amount of data is required to generate such a map as described above. It is impossible to realize the vehicular velocity controlling apparatus having the map.

On the other hand, am assignee to which the present invention is to be assigned filed as an applicant Japanese Patent Application No. Heisei 9-321402 in Japan on Nov. 21, 1997 which corresponds to a Japanese Patent Application First Publication No. Heisei 11-151952 published on Jun. 8, 1999 which is after the filing date of the priority based Japanese Patent Applications in Japan (May 20, 1999) exemplifies another previously proposed vehicular velocity controlling apparatus. This Japanese Patent Application does not form prior art under 35 U. S. C. 102 and 35 U. S. C. 103 and it does not form the state of the art under Article 54(2) EPC.

In the other previously proposed vehicular velocity controlling apparatus, a target vehicular velocity to make the actual inter-vehicle distance substantially equal to a target inter-vehicle distance is supplied to a vehicular velocity controlling (calculating) section calculates a target driving force to perform respective controls for an opening angle of an engine throttle valve and for a braking liquid pressure of a vehicular brake system.

In addition, the vehicular velocity controlling section calculates a deceleration force margin which is a difference between a deceleration force demand value which is a low-pass filter passed value of the target driving force and a maximum deceleration force at a fourth-speed (OD: Over Drive) gear position in accordance with the target vehicular velocity set by an inter-vehicle distance controlling section. When the deceleration force margin is in excess of a predetermined threshold value, the gear position is changed (down shift operation) from the fourth-speed (OD) gear position to a third-speed (OD) gear position and an up shift operation is, thereafter, carried out when the deceleration force margin is equal to or less than the predetermined threshold value, the relative velocity becomes increased so that the inter-vehicle distance becomes wider, and a disturbance estimated value representing a road surface descending slope gradient becomes smaller than the predetermined threshold value.

Although, in the other previously proposed vehicular velocity controlling apparatus, the up shift operation can be inhibited until the vehicle runs on the smaller road surface descending slope gradient, even in a case where other up shift conditions, viz., the deceleration margin and relative velocity are satisfied. Consequently, a so-called, a shift hunting between the up and down shift can be prevented. However, in a case where the vehicle runs on a flat road surface or on a descending slope gradient which is small like a flat road surface in a midway through a steep descending slope gradient such as a mountain road, the other up shift conditions are satisfied and the shift hunting occurs.

In the case where the deceleration force margin is calculated according to the difference between the deceleration force demand value based on the target driving force and the maximum deceleration force based on the target vehicular velocity, there is often the case where the vehicle cannot detect the preceding vehicle through an inter-vehicle distance sensor since the preceding vehicle turns a corner when the vehicle is running on a steep descending slope having hair-pin curves like the mountain road. In this case, since the deceleration force demand value is calculated on the basis of the inter-vehicle distance, the target driving force is reset to "0" to perform the up shift operation.

Thereafter, if the vehicle traps again the preceding vehicle after the vehicle turns the corner described above, the deceleration force demand value becomes large so that the deceleration force margin exceeding the predetermined threshold value causes the gear position of a vehicular transmission to be shifted down. Consequently, the above-described shift hunting occurs whenever the vehicle passes the corner.

It is therefore an object of the present invention to provide vehicular velocity controlling apparatus and method to follow up the preceding vehicle running ahead of the vehicle which can achieve an optimum gear position shift control for the vehicular transmission by a change in a shift threshold value according to a road surface gradient with assurance of the prevention of the shift hunting even when the vehicle cannot trap the preceding vehicle on a long descending slope having many hair pin curves.

According to one aspect of the present invention, there is provided a vehicular velocity controlling apparatus, comprising: an inter-vehicle distance detector to detect an inter-vehicle distance from the vehicle to another vehicle which is running ahead of the vehicle; an inter-vehicle distance calculating section that calculates a target vehicular velocity to make a detected value of the inter-vehicle distance substantially equal to a target inter-vehicle distance; a vehicular velocity detector to detect a vehicular velocity of the vehicle; a vehicular velocity calculating section that calculates a target vehicular driving force to make a detected value of the vehicular velocity substantially equal to the target vehicular velocity; a road surface gradient detector to detect a gradient of a descending slope on which the vehicle is running; and a vehicular velocity controlling section that controls a driving force exerted by a rotary driving force source and a gear position of a vehicular transmission and controls a brake force exerted by a vehicular brake system if the target driving force is negative on the basis of the calculated target driving force, the vehicular velocity controlling section including a gear position shift limiter to place a limitation on a shift of the gear position of the vehicular transmission even under an establishment of a gear position shift condition in accordance with the road surface gradient detected by the road surface gradient detector.

According to another aspect of the present invention, there is provided a vehicular velocity controlling method, comprising: detecting an inter-vehicle distance from the vehicle to another vehicle which is running ahead of the vehicle; calculating a target vehicular velocity to make a detected value of the inter-vehicle distance substantially equal to a target inter-vehicle distance; detecting a vehicular velocity of the vehicle; calculating a target vehicular driving force to make a detected value of the vehicular velocity substantially equal to the target vehicular velocity; detecting a gradient of a descending slope on which the vehicle is running; controlling a driving force exerted by a rotary driving force source and a gear position of a vehicular transmission and simultaneously controlling a brake force exerted by a vehicular brake system if the target driving force is negative on the basis of the calculated target driving force; and placing a limitation on a shift of the gear position of the vehicular transmission even under an establishment of a gear position shift condition in accordance with the road surface gradient.

BRIEF DESCRIPTION OF THE DRAWINGS

FIGS. 11A through 11F are integrally a timing chart for explaining an operation of the vehicular velocity controlling apparatus shown in FIG. 1A when the vehicle is running on the descending slope having a relatively moderate gradient of the descending slope portion in a midway through a long descending slope.

FIG. 12 is a characteristic line diagram of a control map setting an up shift inhibit time duration in a third preferred embodiment according to the present invention.

DETAILED DESCRIPTION OF THE PREFERRED EMBODIMENTS

Reference will hereinafter be made to the drawings in order to facilitate a better understanding of the present invention.

First Embodiment

Figure 1A:
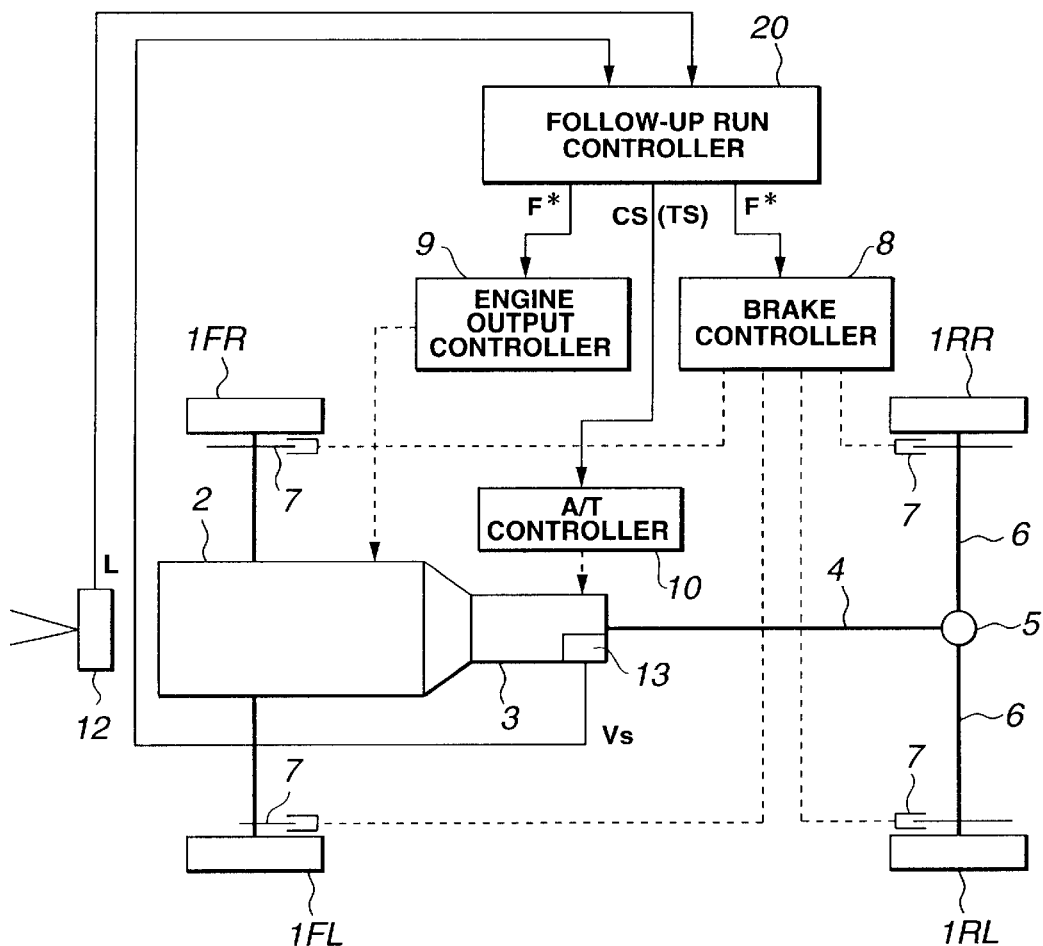
FIG. 1A is a schematic circuit block diagram of a vehicular velocity controlling apparatus in a first preferred embodiment according to the present invention applicable to an automotive vehicle.

FIG. 1A shows a schematic circuit block diagram of a vehicular velocity controlling apparatus in a first preferred embodiment according to the present invention.

In FIG. 1A, 1FL and 1FR denote front left and right road wheels as steered vehicles (or non-driven road wheels) and 1RL and 1RR denote rear left and right road wheels as driven road wheels.

The rear left and right road wheels 1RL and 1RR are rotationally driven with the driving force of an engine (rotary driving source) 2 transmitted via a vehicular transmission 3, a propeller shaft 4, a final speed reduction gear unit 5, and a wheel axle 6.

A disc brake 7 is disposed around each of the front left and right road wheels 1FL and 1FR and the rear left and right road wheels 1RL and 1RR to develop a braking force to its corresponding road wheels. A brake controller 8 serves to control a braking liquid pressure for each of the disc brakes 7 (that is to say, the brake controller 8 actuates a braking actuator to make the actual braking liquid pressure substantially equal to a target braking liquid pressure).

It is noted that the brake controller 8 is constructed in such a manner that the braking liquid pressure is developed in accordance with a depression force of a brake pedal (not shown) and in such a manner that the braking liquid pressure is developed in accordance with a magnitude of a target driving force F* when the target driving force F* transmitted from a follow-up run controller 20 indicates negative.

The engine 2 is provided with an engine output controller 9 to control an output variable of the engine 2.

A method of controlling an engine output may include a method of adjusting an opening angle of an engine throttle valve 2 or a method of adjusting an opening angle of an idle control valve to control an idling revolution speed. However, in the first embodiment, the method of adjusting the opening angle of the throttle valve is adopted.

Furthermore, foran automatic transmission 3, an A/T transmission controller 10 is provided to control a gear position of the transmission 3. When the A/T controller 10 receives an OD (an Over Drive) inhibit control signal CS representing a logical value of "1" from the follow-up run controller 20 to be described later, the A/T controller 10 inhibits a gear shift at a fourth-speed (OD) gear position at the automatic transmission 3 to make a down shift to a third-speed gear position (third gear). With the down shift to the third-speed gear position, the OD inhibit signal CS is returned to a logical value of "0" so that an up shift operation occurs to make the up shift from the third-speed gear position to the fourth-speed (OD) gear position.

On the other hand, an inter-vehicle distance sensor 12 which is constituted by a radar unit as an inter-vehicle distance detector which detects an inter-vehicle distance to the preceding vehicle. As the inter-vehicle distance sensor 12, a range measurement instrument to measure an inter-vehicle distance L can be applied utilizing the radar to measure the inter-vehicle distance L which sweeps, e.g., a laser beam in a front width-wise direction and receives a reflected laser beam from any object, e.g., a preceding vehicle which is running ahead of the vehicle.

In addition, a vehicular velocity sensor 12 is disposed on an output axle of the automatic transmission 3 to detect a revolution speed of the output axle of the automatic transmission 3 to detect a vehicular velocity V.

Each output signal of the inter-vehicle distance sensor 12 and the vehicular velocity sensor 13 is inputted to the follow-up run controller 20. The follow-up run controller 20 controls each required function to the brake controller 8, the engine output controller 9, and A/T controller 10 on the basis of the inter-vehicle distance L detected by the inter-vehicle distance sensor 12 and the vehicular velocity V detected by the vehicular velocity sensor 13. The follow-up run controller 20 performs the follow-up run control to follow up the preceding vehicle maintaining an appropriate inter-vehicle distance to the preceding vehicle. When, during the follow-up run control, the preceding vehicle is running on a descending slope, a shift operation of the automatic transmission 3 is controlled with a down shift threshold value and an up shift threshold value in accordance with the magnitude of the descending slope to control the gear shift position of the automatic transmission 3.

Figure 1B:
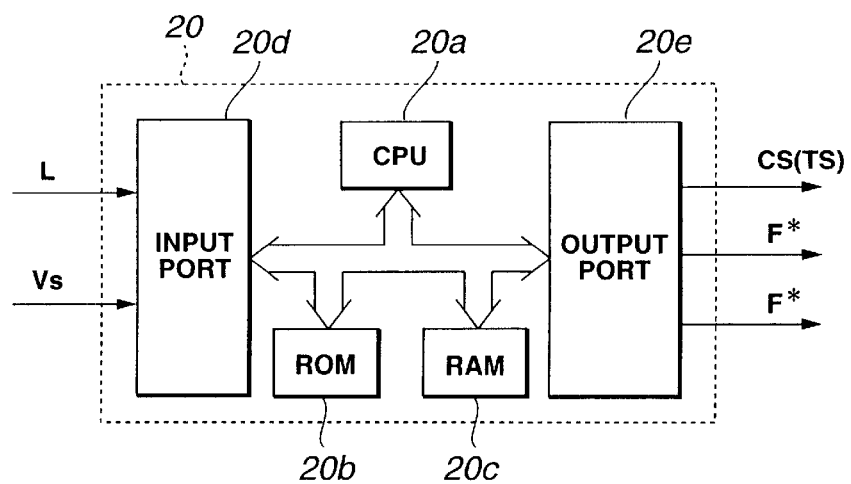
FIG. 1B is a schematic block diagram of a follow-up run controller shown in FIG. 1A.

The follow-up run controller 20 includes, in terms of its hardware, a microcomputer having a CPU (Central Processing Unit) 20a, a ROM (Read Only Memory) 20b, a RAM (Random Access Memory) 20c, an Input Port 20d, an Output Port 20e, and a common bus, as shown in FIG. 1B.

The follow-up run controller 20 functionally includes a distance measuring signal processing section 21 to measure a time duration from a time point at which the inter-vehicle distance sensor 12 is operated to sweep the laser beam in the front width-wise direction to a time point at which the reflected laser beam from the preceding vehicle is received to calculate the inter-vehicle distance L of the vehicle to the preceding vehicle from the measured time duration; a vehicular velocity signal processing section 30 that measures a period of a vehicular velocity sensor 13 to calculate the vehicular velocity Vs; an inter-vehicle distance controlling section 40 that calculates a target vehicular velocity V* to maintain the inter-vehicle distance L at a target inter-vehicle distance L* on the basis of the vehicular velocity Vs by the vehicular velocity signal processing section 30 and the inter-vehicle distance L from the distance measuring signal processing section 30; and a vehicular velocity controlling section 50 that controls operations of the brake controller 8, the engine output controller 9, and the transmission controller 10 on the basis of the target vehicular velocity V*, and the relative velocity A V calculated by the inter-vehicle distance controlling section 40 to make the vehicular velocity Vs substantially equal to the target vehicular velocity V*.

The inter-vehicle distance controlling section 40 includes: a relative velocity calculating section 41 to calculate the relative velocity Δv of the vehicle to the preceding vehicle on the basis of the inter-vehicle distance L inputted from the distance measuring signal processing section 21; a target inter-vehicle distance setting section 42 that calculates a target inter-vehicle distance L* between the preceding vehicle and the vehicle on the basis of the vehicular velocity Vs inputted from the vehicular velocity signal processing section 30; and an inter-vehicle distance calculating section 43 that calculates the target vehicular velocity V* to make the inter-vehicle distance L on the basis of the relative velocity ΔV calculated by the relative velocity calculating section 41 and the target inter-vehicle distance L* calculated by the target inter-vehicle distance setting section 42.

The relative velocity calculating section 41 is constituted b a band pass filter (BPF) which processes the inputted inter-vehicle distance L in a, e.g., a band pass filter.

The band pass filter has a transfer function that can be expressed in the following equation (1).

Since a differential term of a Laplace transform operator s is included in a numerator of the equation (1), the relative velocity ΔV is substantially approximated from the differentiation of the inter-vehicle distance L.

$$F(s)=\omega^2 s/(s^2+2\omega cs+\omega c^2) \quad (1).$$

In the above equation (1), $\omega c=2\pi fc$.

As described above, since the band pass filter having the transfer function as the equation (1) is used as the relative velocity calculating section 41, the calculation of the relative velocity ΔV described above can avoid such an inconvenience case that is weak in a noise interference and that gives an ill influence on a vehicular dynamic (vehicular behavior) such as fluctuations occur in a vehicular body during the follow-up run control in a case where a simplified differential calculation is carried out from a variation rate of the inter-vehicle distance L so as to calculate the relative velocity ΔV. It is noted that a cut-off frequency fc in the equation (1) is determined according to a magnitude of a noise component included in the inter-vehicle distance L and an allowance value of an acceleration variation in a longitudinal direction of the vehicular body in a short period of time.

In addition, the calculation of the relative velocity ΔV may alternatively be carried out by a differential processing using a high pass filter to the inter-vehicle distance L in place of the band pass filter described above.

In addition, the target inter-vehicle distance setting section 42 calculates the target inter-vehicle distance L* in accordance with the following equation (2) from a vehicular velocity V* of the preceding vehicle (Vt=Vs+ΔV) calculated by an addition of the vehicular velocity Vs to the relative velocity ΔV and a time duration To (so-called, inter-vehicle time duration) during which the vehicle has reached to a position Lo (meters) behind the present position of the preceding vehicle.

That is to say, L*=VtxTo+Ls    (2).

Since a concept of the inter-vehicle time duration is introduced into the calculation of the target inter-vehicle distance L*, the target inter-vehicle distance L* is set in such a manner that as the vehicular velocity becomes faster, the inter-vehicle distance becomes large.

In the equation (2), Ls denotes an initial inter-vehicle distance when the vehicle stops.

Furthermore, the inter-vehicle distance calculating section 43 calculates the target vehicular velocity V* on the basis of the actual inter-vehicle distance L, the target inter-vehicle distance L*, and the relative velocity ΔV to follow up the preceding vehicle maintaining the inter-vehicle distance L at its target value L*. Specifically, the target vehicular velocity V* is calculated in accordance with the following equation (3).

That is to say, a target relative velocity ΔV* is first calculated using a liner connection between a value of a multiplication of a distance control gain fd with a deviation (L*−L) between the target inter-vehicle distance L* and the actual inter-vehicle distance L and a value of the multiplication of a velocity control gain fv with the relative velocity ΔV. Then, as shown by the following equation (4), the target vehicular velocity V* is calculated by subtracting the target relative velocity ΔV* from the velocity of the preceding vehicle Vt (=Vs+ΔV).

ΔV*=fd(L*−L)+fd ΔV    (3).

ΔV*=V*−ΔV*    (4).

The vehicular velocity controlling section 50 includes a vehicular velocity servo section 51 which calculates a driving force command value For and a disturbance estimated value dv^ to make the inputted target vehicular velocity V* substantially equal to the vehicular velocity Vs and calculates a target driving force F* constituted by a deviation therebetween; a deceleration force margin calculating section 52 that calculates a deceleration force margin FDK on the basis of the target driving force F* calculated at the vehicular velocity servo section 51 and the target vehicular velocity V*; a threshold value setting section 53A that sets down shift and up shift threshold value THD and THU on the basis of the disturbance estimated value du^ calculated at the vehicular velocity servo section 51; and a shift position determining section 54 to perform a determination of the shift position on the basis of the deceleration force margin $F_{DM}$ calculated by the deceleration force margin calculating section 52, the down shift threshold value $TH_U$ set by the threshold value setting section 53A, the up shift threshold value $TH_U$ set thereby, and the relative velocity ΔV calculated by the relative velocity calculating section 41.

Figure 3:
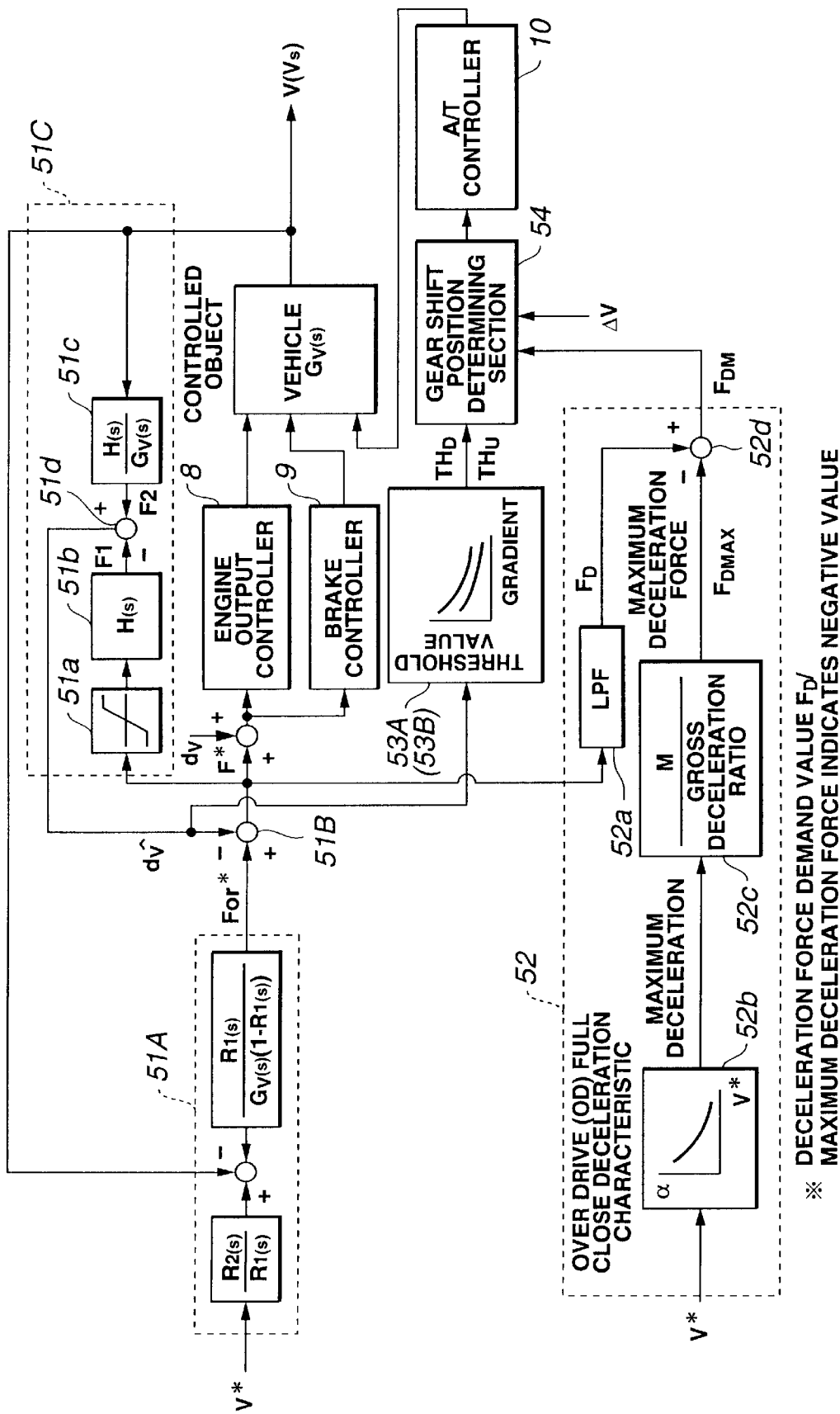
FIG. 3 is a functional block diagram of a vehicular velocity servo(controlling) section in the follow-up run controller 20 shown in FIG. 2.

The vehicular velocity servo section 51 is constituted by a vehicular velocity servo system, for example, by means of a robust model matching control method, as shown in FIG. 3. In details, the vehicular velocity servo system includes a model matching compensator 51A which calculates the driving force command value FOR based on the target vehicular velocity V* inputted from the inter-vehicle controlling section 40; a subtractor 51B which subtracts the disturbance estimated value dv^ from a driving force command value FOR calculated by the model matching compensator 51A; a robust compensator 51C which calculates the disturbance estimated value dv^ on the basis of the target driving force F* to be outputted from the subtractor $F_{OR}$ and the vehicular velocity Vs.

It is noted that the vehicle is an object to be controlled and is represented by a mathematical model of Gv(s) whose manipulated variable is the target driving force F* and whose controlled variable is the vehicular velocity Vs. The transfer function of Gv(s) is assumed to have no dead time element which is a delay inherent to a power train of the vehicle.

The model matching compensator 51A is a compensator to make a response characteristic of a vehicular servo system substantially equal to a reference model. An output response characteristic is set with a reference model $R_2(S)$ in a feed-forward portion, an external disturbance elimination function and a stability are determined by a reference model R1(s) in a feedback portion to calculate the driving force command value FOR from the target vehicular velocity V* and the vehicular velocity Vs.

The robust compensator 51C includes a driving force limiter 51a to limit the inputted target driving force F* I t Aid to a maximum driving force in a positive case (and a maximum braking force in a negative case) which can actually developed on the vehicle; a low pass filter 51b which derives the driving force F1 including the present actual road surface gradient and a model error according to an output of the driving force limiter 51a; a compensator 51c to derive a braking force F2 through its transfer function of H(s)/Gv(s) to maintain the present vehicular velocity Vs which is the transfer function of the low pass filter H(s) multiplied by an inverted vehicular model of Gv(s); and a subtractor 51d to subtract the driving force F1 from the low pass filter 51b.

The subtractor 51d outputs the disturbance estimated value dv^ including a road surface gradient and the model error. It is noted that since the disturbance estimated value dv^ absorbs a running resistance on the model error included in the flat road surface, a variation in the road surface gradient appears as the disturbance estimated value.

Then, the target driving force F* outputted from the subtractor 51B is supplied to the brake controller 8 and the engine output controller 9. If the target braking force F* indicates a negative value and is reduced below a negatively larger value than a predetermined value set in a vicinity to a lowest limit value of a braking force range caused by an engine braking, the braking liquid pressure of each disc brake 7 is controlled so as to develop the braking force in accordance with its magnitude of the target driving force F* when the target driving force F* indicates a positive value.

Then, the target driving force F* outputted from the controller 51B is supplied to the brake controller 8 and the engine output controller 9. When the target braking force F* indicates a negative value and is reduced below a negatively larger value than a predetermined value set in a vicinity to a lowest limit value of a braking force range caused by an engine braking, the braking liquid pressure of each disc brake 7 is controlled so as to develop the braking force in accordance with its magnitude. The engine output controller 9 controls especially the opening angle of the engine throttle valve to develop the driving force in accordance with the magnitude of the target driving force F* when the target driving force F* indicates a positive value and controls the opening angle of the engine throttle valve to close fully the throttle valve when the target driving force F* indicates negative.

As described above, since the target driving force F* is a vector variable, the target driving force F* indicates a target brake force.

On the other hand, the deceleration force margin calculating section 52 includes, as shown in FIG. 3, a low pass filter 52a (LPF) which provides a low pass filtering having a cut off frequency of approximately 0.5 Hz for the target braking force F* to output a deceleration force demand value $F_D$; a maximum deceleration calculating section 52b which calculates the maximum deceleration $\alpha_{MAX}$ to a characteristic memory table representing a relationship of a deceleration $\alpha$ to the vehicular velocity V when the gear position of the automatic transmission is the $4^{th}$(fourth)-speed (OD) gear position and the throttle valve is fully closed; a multiplier 52c to calculate a maximum deceleration force $F_{DMAX}$ at the fourth-speed (OD) by multiplying the maximum deceleration $\alpha_{MAX}$ to a characteristic memory table representing a relationship of a deceleration $\alpha$ to the vehicular velocity V when the gear position of the automatic transmission 3 is the fourth-speed (OD) gear position and the throttle valve is fully closed; a multiplier 52c to calculate a maximum deceleration force $F_{MAX}$ at the fourth-speed (OD) by multiplying the maximum deceleration $\alpha_{MAX}$ calculated by a gross speed-reduction ratio (fourth-speed gear ratio x final gear ratio); and a subtractor 52d to calculate the deceleration force margin $F_{DM}$ by subtracting the maximum deceleration force $F_{DM}$ from the deceleration force demand value $F_D$.

Furthermore, since the threshold value setting section 53A, as shown in FIG. 3, receives the disturbance estimated value dv^ represents substantially road surface gradient outputted from the robust compensator 51c, the threshold value setting section 53A refers to the characteristic memory table representing the relationship between the disturbance estimated value dv^ and the down shift and up shift threshold values $TH_D$ and $TH_U$.

Figure 4:
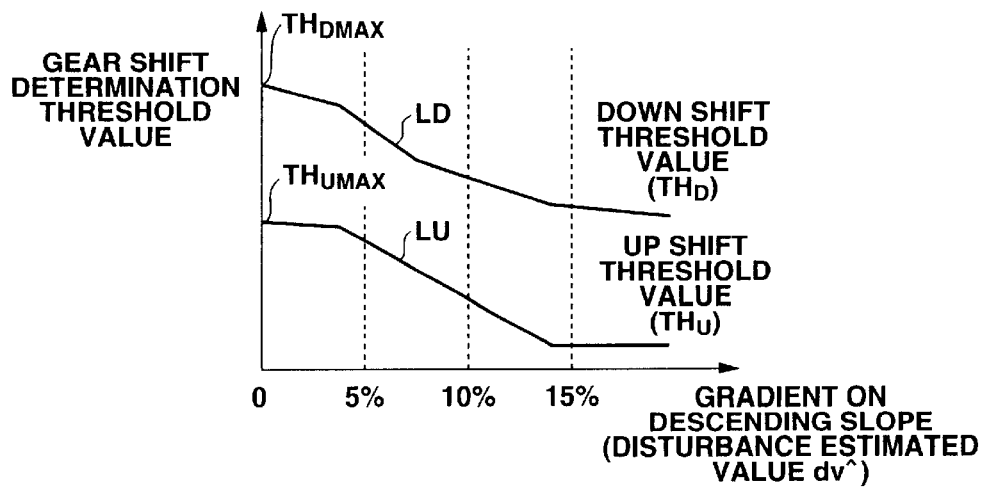
FIG. 4 is an explanatory view for explaining a characteristic memory table representing a relationship between a down shift threshold value ($TH_D$) and an up shift threshold value ($TH_U$).

It is noted that, in the characteristic table shown in FIG. 4, the down shift threshold value $TH_D$ indicates a characteristic line LD such that when the vehicle runs on the flat road surface, namely, the descending slope gradient of 0%, a maximum value of $TH_{DMAX}$ is indicated, when the descending slope gradient is reduced very moderately up to approximately 4%, the characteristic line LD is reduced in a very moderate manner, when the descending slope gradient is reduced at a relatively steep gradient in a range of 4% through 14% and is reduced again by 14% or more. On the other hand, in the characteristic table shown in FIG. 4, the up shift threshold value $TH_U$ indicates another characteristic line such that, when the vehicle runs on the descending slope gradient of 0%, a maximum value TH which is half the maximum value $TH_{DMAX}$ is indicated, when the descending slope gradient is reduced by a relatively moderate gradient, when the descending slope gradient is reduced in a range from 4% to 14%, the line LU is reduced by a very moderate gradient. As the descending slope gradient goes from 4% to 14%, amagnitude of a difference between the down shift threshold value THD and the up shift threshold value $TH_U$ is set to be increased as shown in FIG. 4.

The shift position determining section 54 receives the relative velocity $\Delta V$ calculated by the relative velocity calculating section 41, the deceleration force margin $F_{DM}$ calculated by the deceleration force margin calculating section 52, and the down shift and up shift threshold values $TH_D$ and $TH_U$ set by the threshold value setting section 53A and determine whether the gear shift to the over drive OD is enabled on the basis of these parameters.

Figure 5:
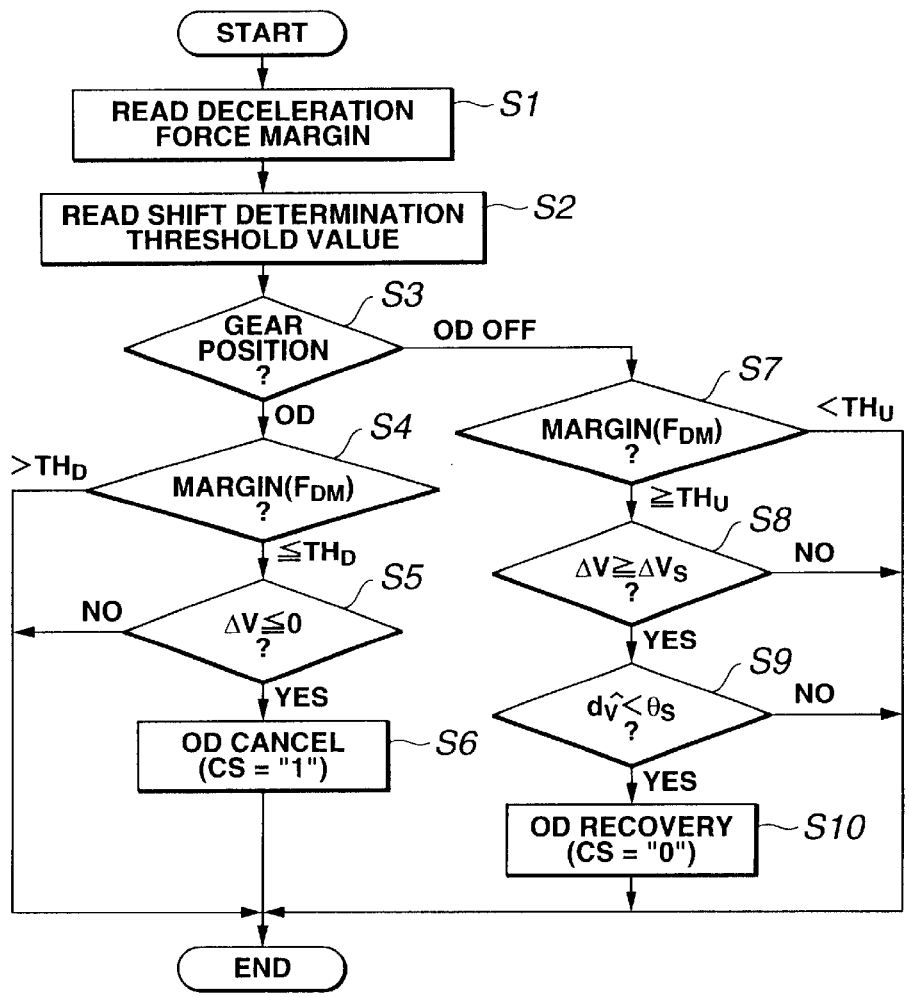
FIG. 5 is an operational flowchart for explaining an example of a gear shift position determining procedure executed by a gear shift position determining section in the first embodiment of the vehicular velocity controlling section.

The shift position determining section 54 executes a shift position determining processing carried out as a timer interrupt processing for each predetermined time (for example, 10 milliseconds), as shown in FIG. 5.

First, at a step S1, the shift position determining section 54, i.e., the CPU 20a of the follow-up run controller 20 reads the deceleration force margin $F_{DM}$ calculated by the deceleration force margin calculator 52. At the next step S2, the shift position determining section 54, viz., the CPU 20a of the controller 20 reads the up shift and down shift threshold values $TH_D$ and $TH_U$ set by the threshold value setting section 53A and determines whether the shift to the overdrive OD is enabled on the basis of these parameters.

The shift position determining section 54 executes a shift position determining processing carried out as a timer interrupt processing for each predetermined time (for example, 10 milliseconds), as shown in FIG. 5.

First, at a step S1, the shift position determining section 54, i.e., the CPU 20a of the follow-up run controller 20 reads the deceleration force margin $F_{DM}$ calculated by the deceleration force margin calculator 52.

At the next step S2, the shift position determining section 54, viz., the CPU 20a of the controller 20 reads the up shift and down shift threshold values $TH_D$ and $TH_U$ set by the threshold value setting section 53A and the routine goes to a step S3.

At the step S3, the CPU 20a of the controller 20 reads the present gear positional information inputted from the A/T controller 10 to determine whether the fourth-speed (OD) gear position or the 3rd-speed gear position, the routine goes to a step S4.

At the step S4, the CPU 20a of the follow-up run controller 20 determines whether the deceleration force margin $F_{DM}$ is equal to or below the down shift threshold value $TH_D$.

If $F_{DM} > TH_D$ at the step S4, the CPU 20a of the follow-up run controller 20 determines that the margin in the deceleration force is sufficiently provided and the timer interrupt routine is ended. If $F_{DM} \leq TH_D$, the routine goes to a step S5. At the step S5, the CPU 20a of the follow-up run controller 20 determines if $\Delta V \leq 0$.

If the relative velocity $\Delta V$ is positive ($\Delta V > 0$), the follow-up run controller 20 determines that the vehicular velocity of the preceding vehicle is fast and the inter-vehicle distance L is long so that no deceleration control is needed and the timer interrupt routine is directly ended.

If $\Delta V \leq 0$, the inter-vehicle distance L becomes short to approach to each other and the routine goes to a step S6.

At the step S6, the fourth-speed (OD) gear position is cancelled. For example, the follow-up run controller 20 outputs the OD inhibit control signal CS having a logical value of "1" to the automatic transmission controller 10 to end the timer interrupt routine.

If the result of determination at the step S3 indicates that the gear position is placed at the 3rd-speed gear position, the routine goes to a step S7.

The CPU 20a of the follow-up run controller 20 determines if the deceleration force margin $F_{DM}$ is equal to or larger than the up shift threshold value $TH_U$.

If $F_{DM} < TH_U$, the CPU 20a of the controller 20 determines that no deceleration force margin is present even if the recovery to the fourth-speed gear position and the timer interrupt routine is directly ended. If $F_{DM} \geq TH_U$, the CPU 20a of the controller 20 determines that the recovery to the fourth-speed gear position gives a sufficient deceleration force and the routine goes to a step S8.

At the step S8, the CPU 20a of the controller 20 determines whether the relative velocity $\Delta V$ is equal to or above a preset value $\Delta Vs$ (for example, $-3$ km/h). If $\Delta V < \Delta Vs$ (No) at the step S81 the CPU 20a of the follow-up run controller 20 determines that a state in which the vehicle is approaching to the preceding vehicle is continued and the routine is directly ended. If $\Delta V \leq \Delta V_s$, the CPU 20a of the controller 20 determines that the approach to the preceding vehicle is almost all converged and the routine goes to a step S9. At the step S9, the CPU 20a of the controller 20 determines if the disturbance estimated value $dv^{\wedge}$ representing the road surface gradient is below a set value $\theta S$.

If $dv^{\wedge} \geq s$ at the step S9 (Yes), the routine goes to a step S10 in which the disturbance estimated value $dv^{\wedge}$ representing the road surface gradient is below the set value $\theta s$. If $dv^{\wedge} \geq \theta s$, the CPU 20a of the controller 20 determines that the vehicle is continued to run on a descending slope and the timer interrupt routine is directly ended.

If $dv^{\wedge} < \theta s$ (No) at the step S9, the CDPU 20a of the controller 20 determines that the vehicle is returned approximately to the flat road running state and the routine goes to a step S10.

At the step S11, the present timer interrupt routine is ended after the OD inhibit control signal CS of, e.g., the logical value of "0" to enable the recovery to the fourth-speed gear position is outputted to the automatic transmission controller 10.

It is noted that the deceleration force margin calculating section 52, the threshold value setting section 53A, and the shift position determining section 54 constitute the shift position determining section.

Next, an operation of the vehicular velocity controlling apparatus in the above-described first embodiment will be described below.

Figure 6A:
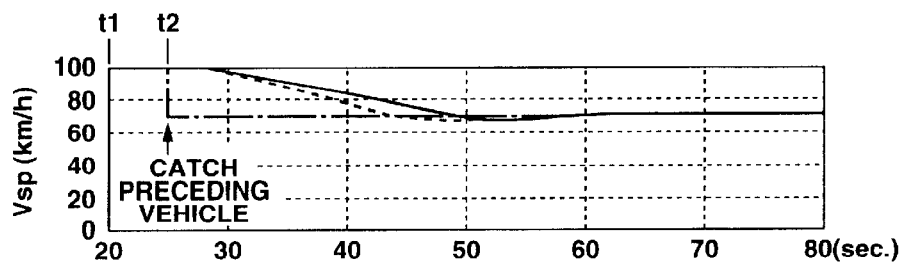
FIGS. 6A through 6E are integrally a timing chart for explaining an operation in the vehicular velocity calculating apparatus shown in FIG. 1A when the vehicle is running on a descending slope having a relatively moderate gradient.

Suppose now that the vehicle cruises (is running at a constant velocity) at, for example, set vehicular velocity of 100 Km/h at a time point t1 in FIG. 6A with the automatic transmission 3 shifted at the fourth-speeed gear position (OD) and with no presence of the preceding vehicle in the front width-wise direction of the vehicle on such a descending slope as a relatively few descending slope. Since no preceding vehicle is present under such a running state, the inter-vehicle distance L denoted by the inter-vehicle distance sensor 12 becomes infinite. Since no preceding vehicle is present under such a vehicular running state as described above, the inter-vehicle distance L detected by the inter-vehicle distance sensor 12 becomes infinite. Since a limiter (not shown) is provided for the inter-vehicle distance sensor 12, the inter-vehicle distance L maintains 120 meters at its maximum as shown in FIG. 6B.

Figure 6B:
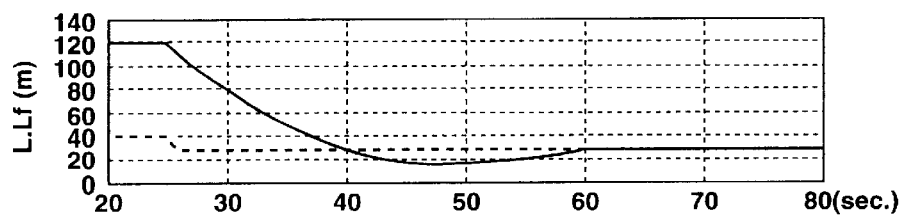
Figure 6C:
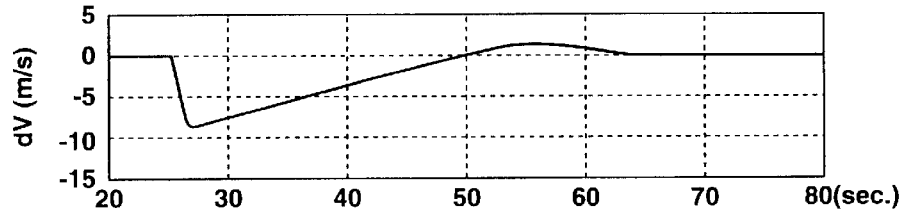

The target inter-vehicle distance L* set by the target inter-vehicle distance setting section 42 is set to 40 meters as shown by a broken line of FIG. 6B. The relative velocity $\Delta V$ calculated by the relative velocity calculating section 41 maintains "0" as shown in FIG. 6C.

Figure 6D:
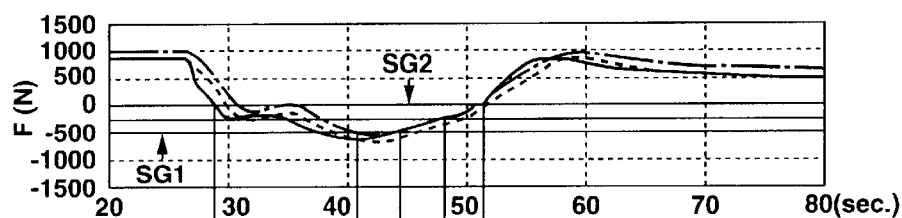

The deceleration force margin $F_{DM}$ outputted from the subtractor 52d of the deceleration force margin calculating section 52 indicates approximately+800 N (N: Newton)) as shown in FIG. 6D.

Figure 6E:
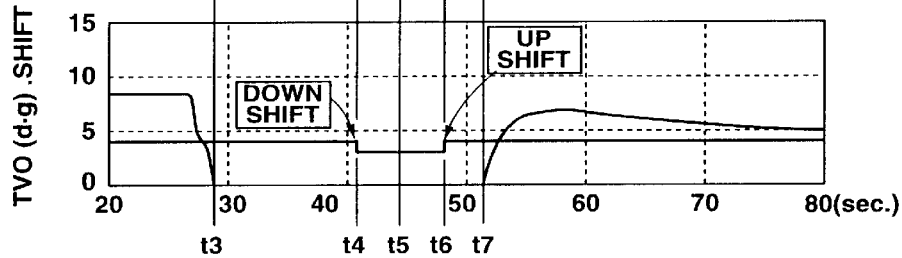

The opening angle of the throttle valve TVO calculated by the engine output controller 9 is set to approximately 80 as shown in FIG. 6E and the gear position of the automatic transmission 3 is set to the fourth-speed gear position as shown in FIG. 6E.

At this time, the deceleration force margin $F_{DM}$ outputted from the subtractor 52d of the deceleration force margin calculating section 52 indicates+800 (N: Newton) as appreciated from FIG. 6D. At this time, the opening angle TVO of the throttle valve controlled by the engine output controller 9 is accordingly set to approximately 8 degrees as shown in FIG. 6E. In addition, the gear position of the automatic transmission 3 is set to the fourth-speed (OD) gear position as shown in FIG. 6E in accordance with the opening angle TVO of the throttle valve.

Since the vehicle is running on a descending slope having the small number of the descending slopes, the disturbance estimated value dv having a relatively large positive value in accordance with the magnitude of the descending slope is outputted from the robust compensator 51C and is subtracted from the driving force command value $F_{OR}$ outputted from the model matching compensator 51A by means of the subtractor 51B. Consequently, the target driving force F* outputted from the subtractor 51B indicates a small value as compared with the case where the vehicle is running on the flat horizontal road and cancels the acceleration caused by the vehicular run on the descending slope.

Hence, since the disturbance estimated value $dv^{\wedge}$ indicates the small value during the vehicular run on the small descending slope gradient, the down shift threshold value $TH_D$ calculated by referring to the characteristic memory table shown in FIG. 4 is set as the relatively large value as near as the flat road and the up shift threshold value $TH_U$ is set to a relatively large value but is smaller than the down shift threshold value $TH_D$.

Suppose, under the above-described state, that the vehicle whose velocity is denoted by a dot-and-dash line of FIG. 6A has caught the preceding vehicle which is running in a steady state at a constant speed of, for example, 70 Km/h and the relative velocity $\Delta V$ to the preceding vehicle calculated by the relative velocity calculating section 41 is –8 m/s at a time point of t2.

At this time, the target vehicular velocity V* calculated by the inter-vehicle distance controlling section 43 is gradually reduced as denoted by a broken line of FIG. 6A.

Accordingly, the target driving force F* calculated by the vehicular velocity servo section 51 is decreased by a relative large gradient as shown in FIG. 6D. Therefore, the opening angle TVO of the throttle valve is controlled in such a way that the value TVO is abruptly closed to 0 degree as shown in FIG. 6E. At a time point of t3, the target driving force F* indicates a negative value. At this time, the value of TVO indicates the fully closed state and the brake force caused by the engine braking is developed.

At this time, since the vehicle is running on the flat horizontal road with no descending slope, the vehicular velocity Vs is gradually reduced in accordance with the reduction of the target vehicular velocity V* as shown in FIG. 6A and the relative velocity $\Delta V$ is gradually increased in the positive direction to zero (66 V→0) from –7 m/s, as shown in FIG. 6C.

On the other hand, the deceleration force demand value $F_D$ which is passed through the low pass filter 52a at the deceleration force margin calculating section 52 is moderately decreased as denoted by the broken line in FIG. 6D with a phase lag to a reduction in the target driving force F*. Accordingly, the deceleration force margin $F_{DM}$ is decreased with an offset variable corresponding to the maximum deceleration force $F_{DMAX}$ with respect to the deceleration force demand value $F_D$, as denoted by the dot-and-dash line in FIG. 6D.

When, at a time point of t4, the deceleration force margin FDM becomes smaller than the down shift threshold value THD, the routine shown in the gear shift position control procedure of FIG. 5 goes from the step S5 to the step S6 so that the OD inhibit control signal CS of the logical value of "1" is outputted to the automatic transmission controller 10. Accordingly, in the automatic transmission 3, the down shift operation from the fourth-speed gear position to the third-speed gear position occurs. Consequently, the brake force caused by the engine braking can be augmented.

Therefore, the vehicular velocity Vs approaches to the target vehicular velocity V* and the inter-vehicle distance L is made substantially equal to the target inter-vehicle distance L* without an overshoot crossing the target inter-vehicle distance L*.

Then, there is an increasing tendency of the target driving force F* due to the reduction of the vehicular velocity Vs caused by the augmentation of the brake force from the engine braking. Accordingly, the deceleration force margin is gradually increased. Even when the deceleration force margin is in excess of the down shift threshold value $TH_D$ at a time point of t5, the gear shift position is in the third-speed gear position at the gear shift position control procedure shown in FIG. 5 goes from the step S3 to the step S7. Since the third-speed gear position is not in excess of the up shift threshold value $TH_U$ which is larger than the down shift threshold value $TH_D$, the third-speed gear position is maintained.

Figure 7A:
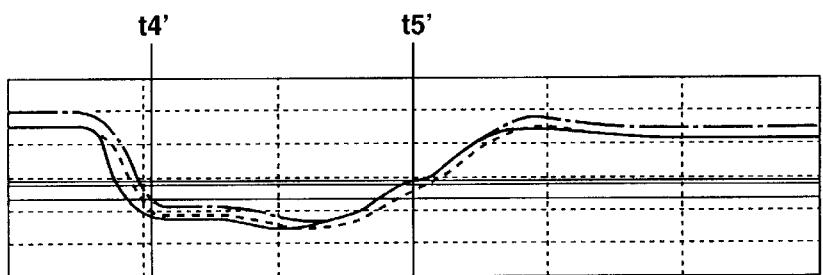
FIGS. 7A through 7B are integrally a timing chart for explaining an operation of the vehicular velocity controlling apparatus shown in FIGS. 1A when the vehicle is running on the descending slope whose gradient is relatively steep.
Figure 7B:
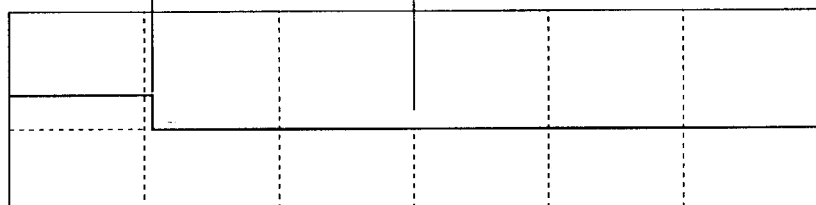

Thereafter, at a time point t4' of FIG. 7B the deceleration force margin is in excess of the up shift threshold value $TH_U$ and the relative velocity $\Delta V$ is made equal to or larger than the set value $\Delta Vs$.

Then, as shown in FIG. 7B, an earlier down shift from the fourth-speed (OD) gear position to the third-gear position occurs. Hence, the brake force due to the large engine braking can be acted upon the vehicle at an earlier time. Consequently, a prevention of such an occurrence that the inter-vehicle distance to the preceding vehicle is abruptly shortened during the vehicular run on the descending slope whose gradient is steep (having a relatively large gradient) so that the vehicle gives the disagreeable feeling to the vehicular driver can be assured.

Thereafter, if the vehicular run is continued on the descending slope such that the descending slope is larger than the set value $\theta s$, the timer interrupt routine is directly ended from the step S9 at the gear shift position control procedure shown in FIG. 5 even when the deceleration force margin $F_{DM}$ is in excess of the up shift threshold value $TH_U$ at a time point t5' shown in FIG. 7A. Hence, the third-speed gear position is maintained and a gear shift hunting phenomenon during the vehicular run on the descending slope can be prevented.

In addition, when, with the down shift to the third-speed gear position carried out, the descending slope gradient on the descending slope is reduced so that the disturbance estimated value dv^ indicates a smaller value and is reduced below the set value $\theta s$, the routine of the gear shift position control procedure in FIG. 5 goes from the step S9 to the step S10. At the step S10, the OD inhibit control signal CS having the logical value of "0" is outputted from the step S9 to the step S10. At the step S10, the OD inhibit control signal CS having the logical value of "0" is outputted to the A/T controller 10 so that the gear position of the automatic transmission 3 is recovered to the fourth-speed (OD) gear position.

Furthermore, in a case where the vehicle is running on the flat horizontal road surface, both of the down shift and up shift threshold values $TH_D$ and $TH_U$ indicate larger values than those set when the vehicle is running on the descending slope gradient so that it becomes difficult to shift down the present gear position. Consequently, the unintentional or undesired down shift operation can be prevented from occurring and no disagreeable feeling of the vehicular driving is given to the vehicular driver.

As described above, in the vehicular velocity controlling apparatus in the first embodiment, at least one or both of the down shift threshold value THD and the up shift threshold value $TH_U$ are variable set in accordance with the magnitude of the gradient of the descending slope on which the vehicle is running. In details, as the magnitude of the gradient of the descending slope becomes larger, both of the down shift and up shift threshold values $TH_D$ and $TH_U$ are reduced so that the downshift operation at the automatic transmission easily occurs to make the down shift timing at the earlier time than the usual. Consequently, the brake force caused by the engine braking can be prevented to improve the preceding vehicle follow-up performance.

Since the differential value between the down shift threshold value $TH_D$ and the up shift threshold value $TH_U$ becomes larger as the magnitude of the gradient of the descending slope becomes larger, it becomes difficult tOo make the gear position shift up to the higher gear position from the present gear position. Thus, the prevention of the shift hunting phenomenon can be achieved without failure. Therefore, since the case where the magnitude of the gradient on the descending slope is below the set value $\theta s$ is added as the condition such that the up shift operation is carried out after the down shift operation during the vehicular run on the descending slope.

Hence, in the case where the vehicle is running continuously on the descending slope whose gradient is equal to or in excess of the set value $\theta s$, the down shift state is continued so that the shift hunting phenomenon does not occur.

In the first embodiment, both of the down shift and up shift threshold values $TH_D$ and $TH_U$ are continuously varied in accordance with the magnitude of the gradient of the descending slope on which the vehicle is running, viz., the disturbance estimated value dv^. However, both of the down shift and up shift threshold values $TH_D$ and $TH_U$ may be varied in a stepwise manner in accordance with an increase in the gradient of the descending slope.

In the first embodiment, the magnitude of the road gradient of the descending slope is estimated from the disturbance estimated value dv^ outputted from the robust compensator 51C.

However, an inclination meter may be installed on the vehicular body so as to directly measure the gradient of the descending slope. Alternatively, with a previously measured gradient information stored in a car navigation system, the gradient information may be used to detect the magnitude of the gradient of the present descending slope.

Furthermore, in the first embodiment, the down shift and up shift operations are carried out between the fourth-speed (OD) gear position and the third-gear position. However, the down shift and up shift operations may be carried out between other gear positions than the above-described gear positions. The present invention is applicable to another type of the automatic transmission 3, a belt-type continuously variable transmission, or toroid type continuously variable transmission.

Furthermore, in the first embodiment, the inter-vehicle distance controlling section 40 and the vehicular velocity controlling section 50 are constituted by the hardware shown in FIG. 1B. These controlling sections 40 and 50 may be constituted by a software.

In the similar way, although the shift position determining section 54 carries out the shift position control procedure shown in FIG. 5, an electronic circuitry of a combination of a digital computer, a digital comparator, OR circuits, and so forth may be used.

In the first embodiment, the follow-up run controller 20 controls the braking force exerted by the vehicular brake system through the brake controller 8 which controls the braking liquid pressure of each disc brake 7, during the vehicular deceleration control.

However, the vehicular brake control may be carried out using only the engine braking through the closure control of the throttle valve and the down shift operation of the automatic transmission.

The vehicular velocity controlling apparatus according to the present invention is applicable to a front wheel drive vehicle in addition to the rear wheel drive vehicle.

The vehicular velocity controlling apparatus according to the present invention is applicable to a rotary drive source such as an electric motor in addition to the engine described in the first embodiment or to a hybrid vehicle using each of the engine and electric motor as the rotary drive source.

Second Embodiment

Figure 8:
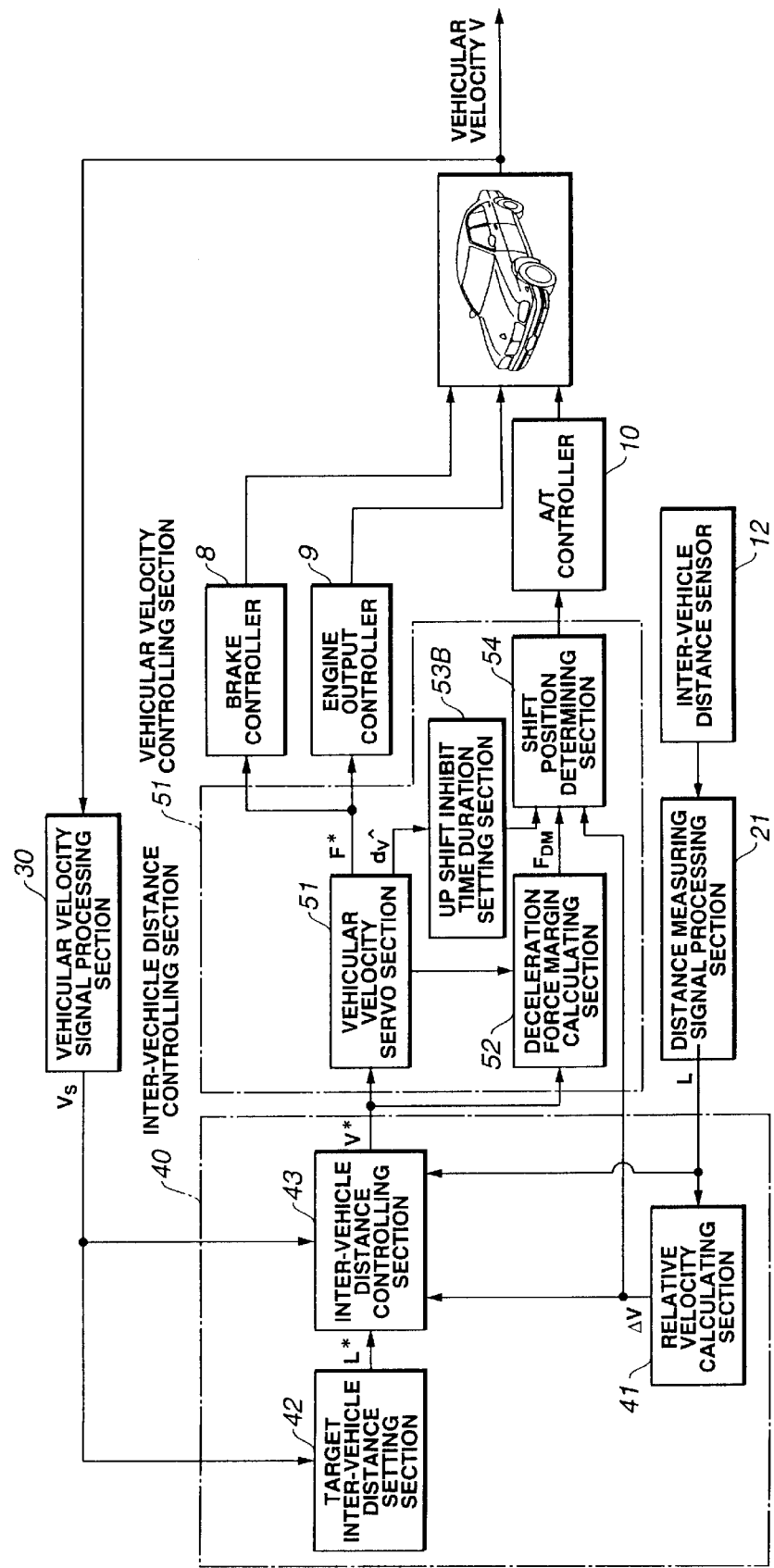
FIG. 8 is a functional block diagram of the vehicular velocity controlling apparatus in a second preferred embodiment according to the present invention.

FIG. 8 shows a functional circuit block diagram of the vehicular velocity controlling apparatus in a second preferred embodiment according to the present invention.

Figure 2:
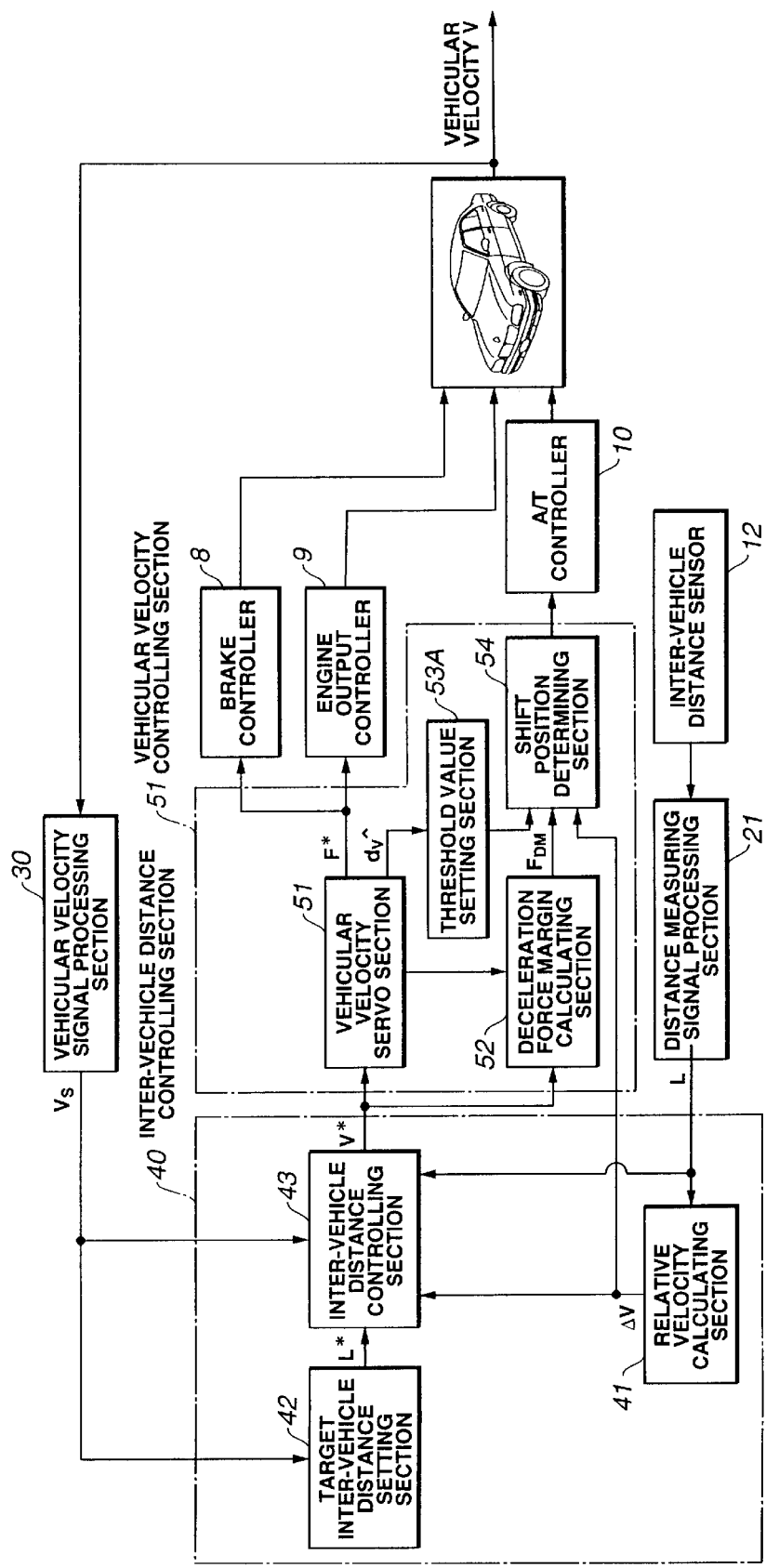
FIG. 2 is a functional circuit block diagram of the vehicular velocity controlling apparatus shown in FIG. 1A.

It is noted that each circuit block diagram of the vehicular velocity controlling apparatus shown in FIG. 8 is generally the same as that shown in FIG. 2 described in the first preferred embodiment but an up shift inhibit time duration setting section 53B is disposed in place of the threshold value setting section 53A.

Hence, the up shift inhibit time duration setting section 53B and its related section 54 will be described below.

Figure 9:
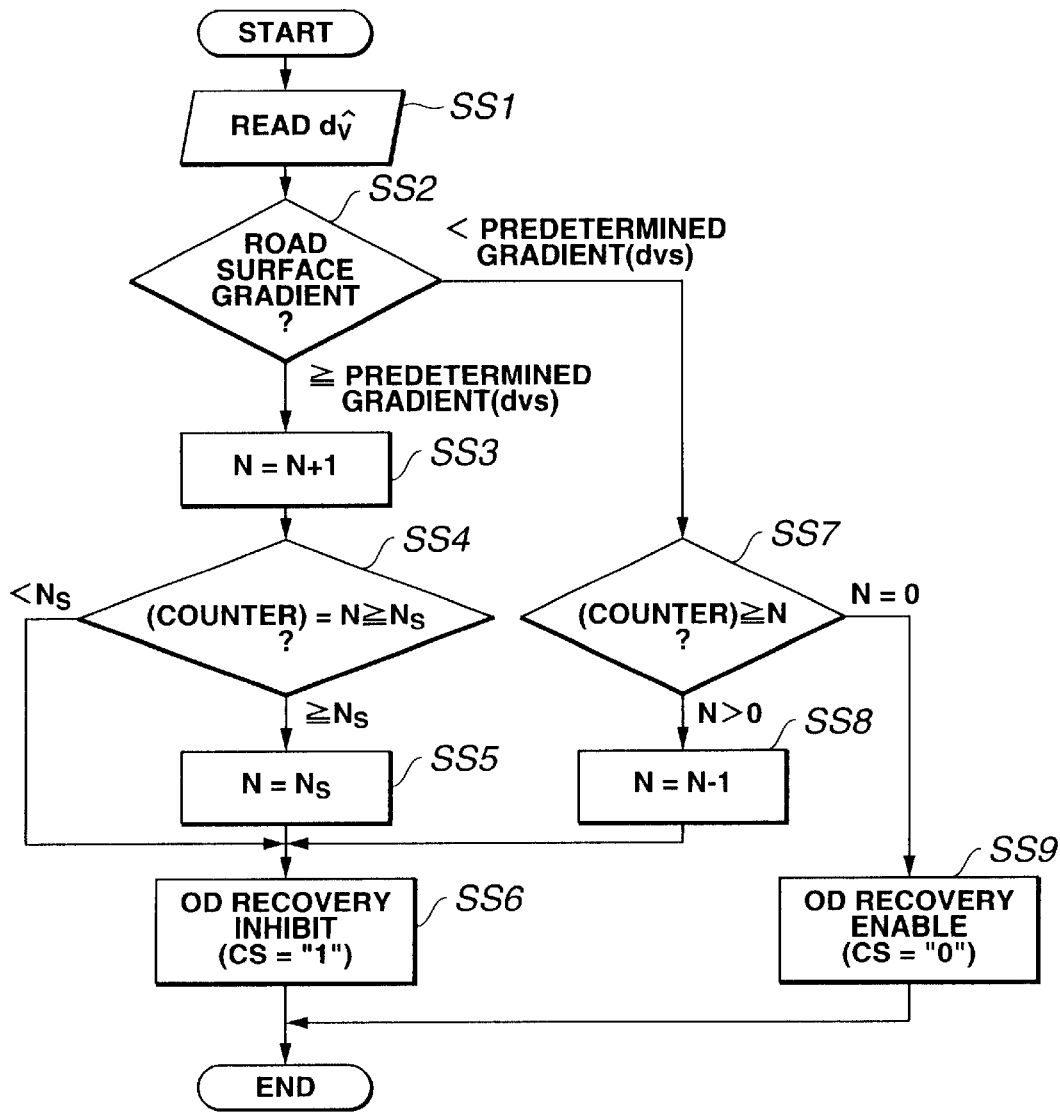
FIG. 9 is an operational flowchart for explaining an example of a gear up shift inhibit time duration executed by an up shift inhibit time duration setting section.

The up shift inhibit time duration setting section 53B receives the disturbance estimated value dv^ representing substantially the gradient of the road surface on which the vehicle is running from the robust compensator 51 and executes the up shift inhibit control procedure shown in FIG. 9 to output the inhibit control signal CS.

The up shift control procedure shown in FIG. 9 is executed as the timer interrupt routine for each predetermined time(for example, 10 milliseconds).

At a first step SS1, the CPU 20a of the controller 20 (viz., the up shift inhibit time duration setting section 53B) reads the disturbance estimated value dv^ representing the road surface gradient.

At the step SS2, the CPU 20a of the controller 20 determines if the road surface gradient dvs (the set value) corresponding to a relatively large descending slope gradient (for example, 10%).

If dv^$\geq$dvs at the step SS2, the controller 20 determines that the vehicle is running on the descending slope and the routine goes to a step SS3.

At the step SS3, a count value N of a software counter is incremented by one and the routine goes to a step SS4.

At the step SS4, the controller 20 determines if the count value of N is equal to or greater than a set count value Ns (Ns corresponds to, for example, 60 seconds).

If N<Ns at the step SS4, the routine goes to a step SS6. If N$\geq$Ns at the step SS4, the routine goes to a step SS5. At the step SS5, the count value N is assigned to Ns (N=Ns) and the routine goes to the step SS6.

At the step SS6, the inhibit control signal CS having the logical value of "1" is outputted to the gear shift position determining section 54 and the timer interrupt procedure is ended to return to a predetermined main program routine.

On the other hand, if dv^<dvs at the step SS2, the controller 20 determines that the vehicle is running on the flat horizontal road or such a descending slope as having the relatively small road surface gradient. Then, the routine goes to a step SS7.

At the step SS7, the controller 20 determines if the count value of N is zero or plus. If N>0 at the step SS7, the routine goes to a step SS8. At the step SS8, the count value N is decremented by one (N=N−1) and the routine goes to a step SS6.

If N=0 at the step SS7, the routine shown in FIG. 9 goes to a step SS9 in which the inhibit control signal CS having the logical value of "0" is outputted to the shift position determining section 54 and the present timer interrupt routine is ended and is returned to the main program routine.

The gear shift position determining section 54 carries out the occurrence of the gear shift between the fourth-speed (OD) gear position and third-speed gear position on the basis of the relative velocity $\Delta V$ calculated by the relative velocity calculating section 41 of the inter-vehicle distance controlling section 30, the deceleration force margin calculating section 52, and the inhibit control signal CS outputted from the up shift inhibit time duration setting section 53.

Figure 10:
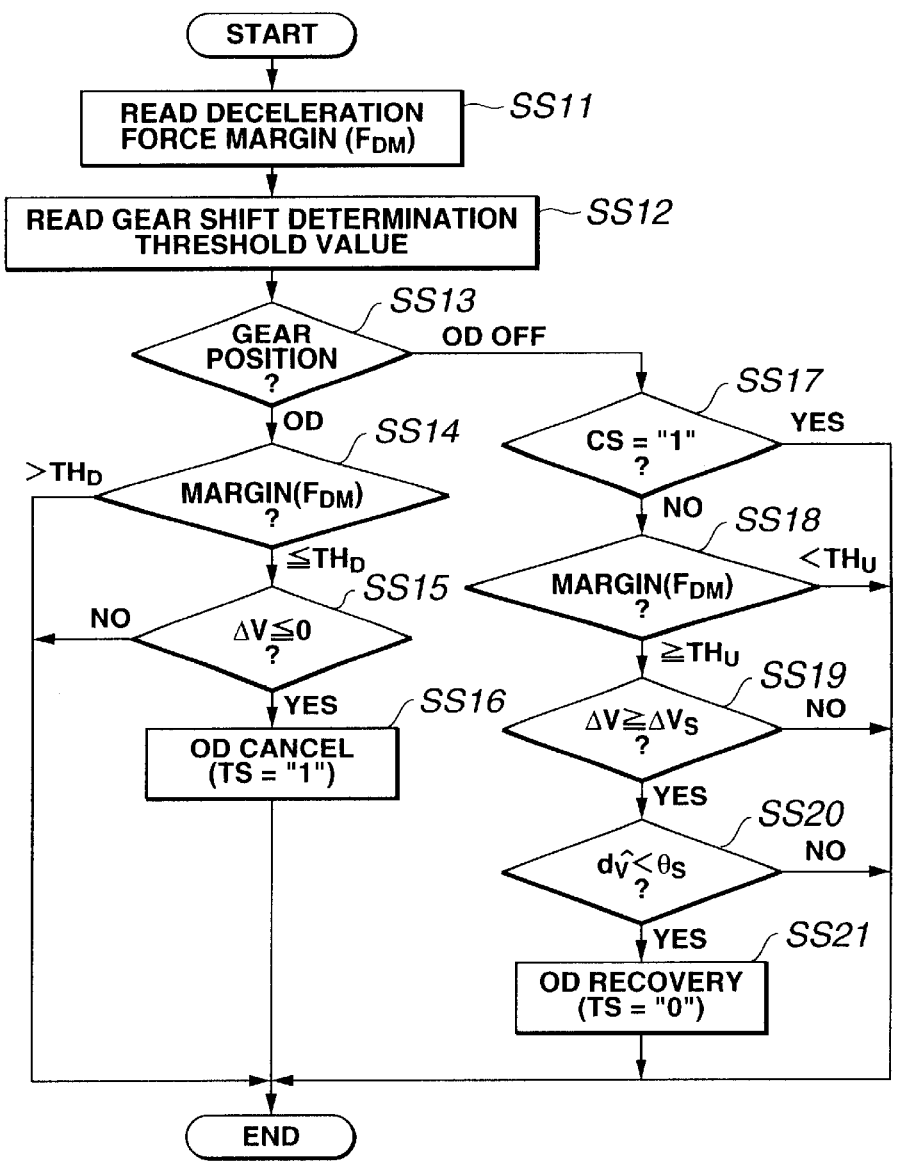
FIG. 10 is an operational flowchart for explaining an example of the gear shift position determining procedure in the second embodiment of the vehicular velocity controlling section.

The gear shift position determining section 54 executes the gear shift position determining procedure shown in FIG. 10 carries out as a timer interrupt routine for each predetermined time (10 milliseconds).

At a step SS11, the CPU 20a of the follow-up run controller 20 (viz., the gear position determining section 54) reads the deceleration force margin calculating section 52 and the routine shown in FIG. 10 goes to a step SS12 in which the gear shift position determining section 54 reads the inhibit control signal CS outputted from the up shift inhibit time duration setting section 53 and the routine goes to a step SS13.

At the step SS13, the gear shift position determining section 54 reads the present gear position information inputted from the A/T controller 10, determines if the present gear position is at the fourth-speed (OD) gear position or at the third-speed gear position, viz., OD ON or OD OFF.

If the present gear position is OD ON (viz., the fourth-speed (OD) gear position) (Yes), the routine of FIG. 10 goes to a step SS14. At the step SS14, the gear shift position determining section 54 determines whether the deceleration force margin $F_{DM}$ is equal to or below the down shift threshold value $TH_D$. If $F_{DM}>TH_D$ at the step SS14, the gear shift position determining section 54 determines that the margin of the deceleration force is sufficient and the present routine is ended.

If $F_{DM <THD}$ at the step SS14, the gear position determining section 54 determines that there is no sufficient margin in the deceleration force and the routine goes to a step SS15.

At the step SS15, the gear position determining section 54 determines if the relative velocity $\Delta V$ indicates "0" or negative.

If $\Delta V>0$ at the step SS15, the gear position determining section 54 determines that the vehicular velocity of the preceding vehicle is higher than that of the vehicle and the inter-vehicle distance L becomes longer so as not to require the deceleration control for the vehicle and the present routine is ended.

If $\Delta V\leq 0$ (Yes) at a step SS15, the routine goes to a step SS16 since there is a tendency for the inter-vehicle distance L to become short to approach to the preceding vehicle and the deceleration control is needed. At the step SS16, the gear position determining section 54, viz., the follow-up run controller 20 outputs the OD inhibit control signal CS to the A/T controller 10 having the logical value of "1" which cancels the fourth-speed (OD) gear position and ends the timer interrupt routine.

In addition, when the result of determination at the step SS13 indicates that the present gear position is placed at the third-speed gear position, the present routine goes to a step SS17.

At the step SS17, the controller 20, i.e., the section 54 determines that the OD inhibit control signal CS has the logical value of "1". If CS="1" (yes) at the step SS517, the section 54 determines that the up shift operation is being inhibited and the timer interrupt routine is ended.

If CS="0" (No) at the step SS17, the gear position determining section 54 determines that the up shift is enabled and the routine goes to a step SS18.

At the step SS18, the section 54 determines if $F_{DM} \geq TH_U$.

If $F_{DM} < TH_U$ at the step SS18, the section 54 determines that there is no margin of the deceleration force even if the gear position is returned to the fourth-speed (OD) gear position and the present routine is ended. If $F_{DM} \geq TH_U$ at the step SS18, the section 54 determines that there is a sufficient margin in the deceleration force even if returned to the fourth-speed gear position and the routine goes to a step SS19.

At the step SS19, the controller 20 determines if $\Delta V \geq \Delta Vs$ ($\Delta Vs$ denotes a present value for the relative velocity $\Delta V$ and, for example, is −3 Km/h.

If $\Delta V < \Delta Vs$ (No) at the step SS19, the section 54 determines that the approach to the preceding vehicle is continued and the present routine is ended.

If $\Delta V < \Delta Vs$ (No) at the step SS19, the section 54 determines that the approach to the preceding vehicle is continued and the present routine is ended.

If $\Delta V \geq \Delta Vs$ (Yes) at the step SS19, the section 54 determines that the approach to the preceding vehicle is almost converged and the routine goes to a step SS20.

At the step SS20, the section 54 determines if the disturbance estimated value dv^ representing the road surface gradient is below the set value θ representing the relatively small descending slope gradient.

If dv^≧θS (No) at the step SS20, the follow-up run controller 20 determines that the vehicle is still continued to run on the descending slope and the present routine is ended. If dv^<θs (Yes) at the step SS20, the Controller 20 determines that the vehicle is running on the substantially flat road surface and the routine goes to a step SS21.

At a step SS21, the CPU 20a of the follow-up run controller 20 outputs, for example, the OD inhibit control signal CS having the logical value of "0" to enable the return (recovery) to the fourth-speed (OD) gear position to the A/T controller 10 and the present routine is ended.

Next, an operation of the vehicular velocity controlling apparatus in the second embodiment will be described with reference to FIGS. 6A through 6E and FIGS. 11A through 11F.

Suppose now that the vehicle is running on the descending slope whose gradient is relatively small with no presence of the preceding vehicle with the gear position of the automatic transmission 3 shifted to the fourth-speed (OD) gear position, the vehicular velocity Vs is the constant cruise speed of, for example, 100 Km/h, and the count value N of the up shift inhibit time duration setting section 53 is cleared to "0", at a time point of t11 shown in FIG. 11A.

It is noted that since, under the above-described running condition, no preceding vehicle is present, the inter-vehicle distance L detected by the inter-vehicle distance sensor 12 indicates infinite. However, since the limiter (not shown) is provided, the inter-vehicle distance L is maintained at 120 meters (refer to FIG. 6B) of its maximum value. Hence, the target inter-vehicle distance L* set by the target inter-vehicle distance setting section 42 is set to 40 meters (as denoted by the broken line of FIG. 6B).

The relative velocity $\Delta V$ calculated by the relative velocity calculating section 41 is maintained at "0" (as shown in FIG. 6C). The deceleration force margin $F_{DM}$ outputted by the subtractor 52d of the deceleration force margin calculating section 52 is maintained at "0" (refer to FIG. 6C).

The deceleration force margin $F_{DM}$ outputted from the subtractor 52d of the deceleration margin calculating section 52 approximately indicates+800 (N) (as shown in FIG. 6D).

The opening angle of the throttle valve TVO calculated by the engine output controller 9 is set to approximately 8° as shown in FIG. 6E and the gear position of the automatic transmission 3 is set to the fourth-speed gear position as shown in FIG. 6E.

At this time, the deceleration force margin $F_{DM}$ outputted from the subtractor 52d of the deceleration force margin calculating section 52 indicates+800 (N: Newton) as appreciated from FIG. 6D. At this time, the opening angle TVO of the throttle valve controlled by the engine output controller 9 is accordingly set to approximately 8 degrees as shown in FIG. 6E. In addition, the gear position of the automatic transmission 3 is set to the fourth-speed (OD) gear position as shown in FIG. 6E in accordance with the opening angle TVO of the throttle valve.

Since the vehicle is running on a descending slope having the small number of the descending slopes, the disturbance estimated value dv^ having a relatively large positive value in accordance with the magnitude of the descending slope is outputted from the robust compensator 51C and is subtracted from the driving force command value $F_{OR}$ outputted from the model matching compensator 51A by means of the subtractor 51B. Consequently, the target driving force F* outputted from the subtractor 51B indicates a small value as compared with the case where the vehicle is running on the flat horizontal road and cancels the acceleration caused by the vehicular run on the descending slope.

On the other hand, since, in the up shift time duration setting section 53, the vehicle is running on the descending slope whose gradient is small and the disturbance estimated value dv^ is accordingly small. Hence, since dv^<dvs at the step SS2 in FIG. 9, the routine of FIG. 9 goes to the step SS7. Since the count value N is cleared to "0", the routine goes to the step S9 in which the inhibit control signal CS having the logical value of "0" is outputted to the gear shift position determining section 54.

Suppose, under the above-described state, that the vehicle whose velocity is denoted by a dot-and-dash line of FIG. 6A has caught the preceding vehicle which is running in a steady state at a constant speed of, for example, 70 Km/h and the relative velocity $\Delta V$ to the preceding vehicle calculated by the relative velocity calculating section 41 is −8 m/s at a time point of t2.

At this time, the target vehicular velocity V* calculated by the inter-vehicle distance controlling section 43 is gradually reduced as denoted by a broken line of FIG. 6A.

Accordingly, the target driving force F* calculated by the vehicular velocity servo section 51 is decreased by a relative large gradient as shown in FIG. 6D. Therefore, the opening angle TVO of the throttle valve is controlled in such a way that the value TVO is abruptly closed to 0 degree as shown in FIG. 6E. At a time point of t3, the target driving force F* indicates a negative value. At this time, the value of TVO indicates the fully closed state and the brake force caused by the engine braking is developed.

At this time, since the vehicle is running on the flat horizontal road with no descending slope, the vehicular velocity Vs is gradually reduced in accordance with the reduction of the target vehicular velocity V* as shown in FIG. 6A and the relative velocity ΔV is gradually increased in the positive direction to zero (ΔV→0) from −7 m/s, as shown in FIG. 6C.

On the other hand, the deceleration force demand value $F_D$ which is passed through the low pass filter 52a at the deceleration force margin calculating section 52 is moderately decreased as denoted by the broken line in FIG. 6D with a phase lag to a reduction in the target driving force F*. Accordingly, the deceleration force margin $F_{DM}$ is decreased with an offset variable corresponding to the maximum deceleration force $F_{DMAX}$ with respect to the deceleration force demand value $F_D$, as denoted by the dot-and-dash line in FIG. 6D.

When, at a time point of t4, the deceleration force margin $F_{DM}$ becomes smaller than the down shift threshold value THD, the routine shown in the gear shift position control procedure of FIG. 5 goes from the step S5 tot he step S6 so that the OD inhibit control signal CS of the logical value of "1" is outputted to the automatic transmission controller 10. Accordingly, in the automatic transmission 3, the down shift operation from the fourth-speeed gear position to the third-speed gear position occurs. Consequently, the brake force caused by the engine braking can be augmented.

Hence, the vehicular velocity Vs approaches to the target vehicular velocity V* and the inter-vehicle distance L follows up the target inter-vehicle distance L* without a large reduction of the actual inter-vehicle distance L below the target inter-vehicle distance L*. Then, due to the reduction of the vehicular velocity Vs caused by the increase in the brake force through the engine braking, the target driving force F* tends to be increased. Accordingly, the deceleration force margin $F_{DM}$ is gradually increased. Even if the deceleration force margin $F_{DM}$ exceeds the down shift threshold value $TH_D$ at the time point of t5, the gear shift position controlling routine shown in FIG. 10 goes from the step SS13 to the step SS17. Since the OD inhibit control signal CS is continued to have the logical value of "0", the routine of FIG. 10 goes to the step SS18. Since the deceleration force margin $F_{DM}$ does not exceed the up shift threshold value $TH_U$ which is larger than the down shift threshold value $TH_D$, the gear position of the automatic transmission 3 maintains the third-speed gear position.

Thereafter, when the deceleration force margin $F_{DM}$ exceeds the up shift threshold value $TH_U$ and the relative velocity ΔVs is equal to or larger than the set value ΔVs, the vehicle is running on the descending slope having the small gradient so that the disturbance estimated value dv^ is substantially equal to zero and is below the set value θs, the routine shown in FIG. 10 goes to the step SS20 via the steps SS17, SS18, and SS19. Since, at the step SS20, dv^<θs, the routine goes to the step SS21 in which the gear position of the automatic transmission 3 is returned to the fourth-speed (OD) gear position through the A/T controller 10 with the OD inhibit control signal CS returned to the logical value of "0".

At this time, although the vehicular velocity Vs is reduced below the vehicular velocity of the preceding vehicle, the target driving force F*, in turn, indicates positive. Since the engine output controller 9 is used to gradually increase the throttle valve opening angle TVO, the vehicular velocity Vs is increased so as to make it substantially equal to the vehicular velocity when the inter-vehicle distance L is made substantially equal to the target inter-vehicle distance L* to follow up the preceding vehicle at the target inter-vehicle distance L*.

As described above, in a case where the vehicle is running on the descending slope gradient, the OD inhibit control signal CS having the logical value of "0" which enables the up shift operation in the automatic transmission 3 is outputted from the gear shift position determining section 54 due to the small descending slope gradient, it becomes not easy to shift up the gear position after the down shift operation from the fourth-speed (OD) gear position to the third-speed gear position has occurred. An appropriate up shift operation without giving the disagreeable feeling to the vehicular driver can be achieved and a fuel economy can be improved.

On the other hand, when the vehicle follows up the preceding vehicle on the descending slope having the relatively steep gradient (for example, approximately 15 degrees) at a time point of t11 in FIG. 11A, the routine shown in FIG. 9 goes from the step SS2 to the step SS3 so that the count value of (N) is incremented whenever the count time up occurs for each timer interrupt period, as shown in FIG. 11B. Then, the OD inhibit control signal CS is set to the logical value of "1" as shown in FIG. 11C. Thereafter, at the time point of t12, when the count value of N reaches to the set value of Ns, the set value Ns is maintained.

In addition, the relative velocity ΔV increases in the negative direction as shown in FIG. 11D and the inter-vehicle distance is shortened. The deceleration force margin $F_{DM}$ is reduced as shown in FIG. 11E. At a time point of t13, if the deceleration force margin $F_{DM}$ is reduced below the down shift threshold value THD, the routine goes from the step SS14 to the step SS15 at the shift control procedure shown in FIG. 10. Since ΔV<0, the routine goes from the step SS15 to the step SS16 in which the OD inhibit control signal CS having the logical value of "1" is outputted to the A/T controller 10. The down shift operation from the fourth-speed (OD) gear position to the third-speed gear position occurs as shown in FIG. 11F.

Under the above-described running state, if the disturbance estimated value dv^ is below the set value of dvs since the gradient of the descending slope becomes small at a time point of t14 shown in FIG. 11A, the routine in the up shift inhibit time duration setting measuring process of FIG. 9 goes from the step SS2 to the step SS8. Since N>0, the routine of FIG. 9 goes to the step SS9. With the count value of N decremented by one, the routine of FIG. 9 goes to the step SS7 to maintain the OD inhibit control signal CS to the logical value of "1".

As described above, during the moderate descending slope gradient, the count value of N is sequentially reduced, the disturbance estimated value dv^ becomes below the set value of θ while the descending slope becomes small and approaches to the flat road surface. Then, even if the up shift operation condition such that the deceleration force margin $F_{DM}$ is in excess of the up shift threshold value $TH_U$ and the relative velocity ΔV is equal to or larger than the set value ΔVs is satisfied, the OD inhibit control signal CS is maintained at the logical value of "1", the up shift operation is inhibited, and the third-speed gear position is maintained.

Thereafter, when the descending slope gradient is started to be increased at a time point of t16 and the disturbance estimated value dv^ is increased to become equal to or in excess of the set value dvs, the increment of the count value of N is started. When the count value N has reached to the set value Ns, the set value Ns is retained at a time point of t15 shown in FIG. 11B.

Next, if the magnitude of the gradient of the descending slope becomes moderate and the disturbance estimated value dv^ is below the set value dvs at a time point of t17, the count value N is started to be decreased. Since the disturbance estimated value dv maintains the small value, the count value N reaches to "0" at a time point of t18. At this time, the OD inhibit control signal CS is returned to the logical value of "0". Accordingly, at the gear shift control procedure of FIG. 10, the routine goes from the step SS17 to the step SS18. Since ΔV≧ΔVs and dv^<θs, the routine goes to the step SS21 in which the OD inhibit control signal CS having the logical value of "0" is outputted to the A/T controller 10 so that the automatic transmission 3 has shifted up to the fourth-speed (OD) gear position.

As described above, when, in the second embodiment, the vehicle is running on the descending slope having a larger gradient than the predetermined gradient of descending slope, the count value of N of the software counter serving as a time measuring counter is incremented to measure the continuous running time duration. If the descending slope becomes moderate and the gradient thereof becomes smaller than the predetermined descending slope gradient, the count value of N is decremented. At the time point at which the count value of N has reached to "0", the OD inhibit control signal CS is returned to the logical value of "0".

Consequently, the inhibit state of the up shift operation is released. Hence, in a case where, in a midway through the vehicle is running on a long descending slope, the road surface on which the vehicle is running becomes the descending slope with the small gradient or flat with no gradient and, thereafter, again becomes the steep descending slope, the down shift state is continued even if the up shift state is continued even if the up shift condition is satisfied with the small descending slope gradient. Consequently, the prevention of the gear shift hunting phenomenon can be assured.

It is noted that although the up shift inhibit state time duration is set by means of the up shift inhibit time duration setting block 53 in terms of the software, the up shift inhibit time duration setting section may be constituted by the hardware of electronic circuitry such as a comparator, clock signal generator, up/down counter, and so forth.

In addition, although the count value of N is incremented as described in the second embodiment, a preset value may be set when the descending slope gradient equal to or longer than the predetermined slope gradient is detected. Then, the preset value may be counted in the decrement direction and may be counted in the increment direction when the descending slope gradient is moderate. When exceeding the preset value, the inhibit control signal CS may be returned to the logical value of "0".

Furthermore, although, in the second embodiment, the up shift inhibit time duration setting section 53 and the shift position determining section 54 are individually calculated, the functions of these sections 53 and 54 may integrally be performed. The function of the deceleration force margin calculating section 52 may integrally be performed together with those sections, or the functions of these sections 53 and 54 may integrally be performed together with the inter-vehicle distance controlling section 40 and the vehicular velocity controlling section 50.

Third Embodiment

The vehicular velocity controlling apparatus in a third preferred embodiment according to the present invention will be described with chief reference to FIG. 12.

In the third embodiment, when the vehicle is running on a steep descending slope having a large gradient and having a great number of hair pin curves, the shift hunting phenomenon which would generally occur when the preceding vehicle cannot be trapped by means of the inter-vehicle distance sensor 12 any more at each cornering run in the corresponding one of the hair pin curves.

Figure 13:
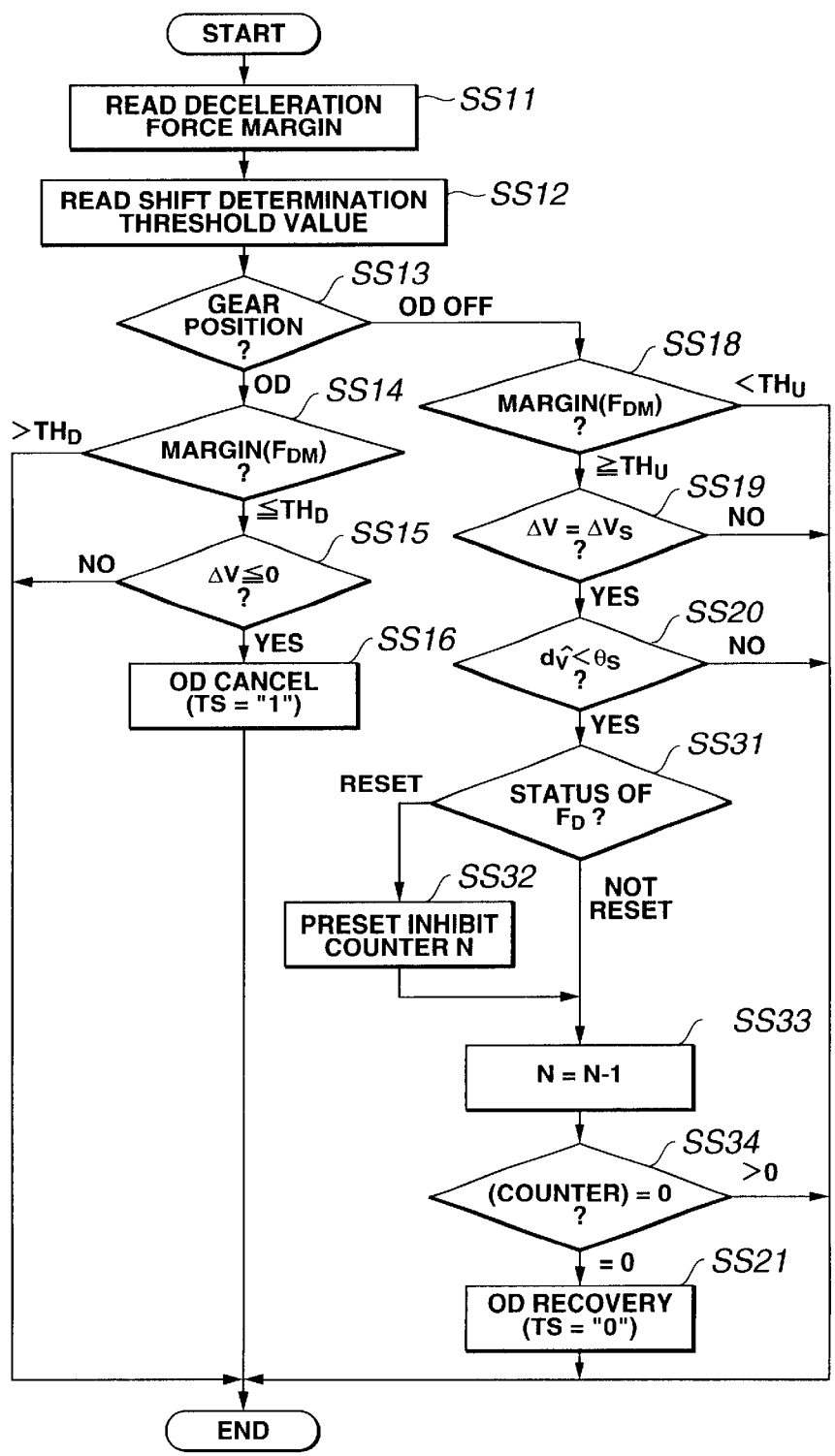
FIG. 13 is an operational flowchart for explaining an example of a gear shift control procedure executed in the gear shift position determining section in the third embodiment of the vehicular velocity controlling apparatus.

In the third embodiment, the up shift inhibit time duration is set by the up shift inhibit time duration setting section 53 in the vehicular velocity controlling section 51 referring to an inhibit time duration setting map representing the relationship between the disturbance estimated value dv^ and the up shift inhibit time duration shown in FIG. 12 on the basis of the disturbance estimated value dv^ representing substantially the gradient of the descending slope. Then, according to the reference to the inhibit time duration setting map, another shift control procedure shown in FIG. 13 is carried out by means of the gear shift position determining section 54.

The other structure and procedure in the third embodiment are the same as those described in the first or second embodiment.

FIG. 12 shows the up shift inhibit time setting map.

As shown in FIG. 12, a lateral axis denotes the disturbance estimated value dv^ corresponding to the descending slope gradient and a longitudinal axis denotes the up shift inhibit time duration.

When the vehicle is running on the flat road surface at which the disturbance estimated value dv^ indicates zero, the up shift inhibit time duration $T_{UI}$ indicates zero.

The up shift inhibit time duration $T_{UI}$ is relatively moderately increased during the increase in the disturbance estimated value dv^ up to a value corresponding to the descending slope of, for example, 5%. The up shift inhibit time duration TUI is increased by a predetermined rate of increase higher than that up to 5% described above while the disturbance estimated value dv^ is increased to a value corresponding to the descending slope gradient of, for example, 15%. Then, while the disturbance estimated value dv^ exceeds the value corresponding to the descending slope of 15%, the up shift time duration is set to be constant.

FIG. 13 shows the gear shift control procedure executed by the gear shift position determining section 54.

As compared with the flowchart shown in FIG. 10, the step SS17 shown in FIG. 10 has been omitted but steps SS31, SS32, SS33, and SS34 have been interposed between the steps SS20 and SS21.

In details, at the step SS31, the CPU 20a of the follow-up run controller 20 (viz., the gear shift position determining section 54) determines if the deceleration force demand value $F_D$ has been reset.

At the step S33, the gear shift position determining section 54 is decremented when the result of determination at the step SS31 indicates that the deceleration force demand value $F_D$ is not reset and the preset value is set to the count value N of the inhibit counter.

At the step SS34, the gear shift position determining section 54 determines if the count value of N indicates N=0. If N=0 at the step SS34, the routine goes to the step SS21.

The other steps are the same as those having the like step numbers in FIG. 10 and the detailed description thereof will herein be omitted.

Since, in the third embodiment, the up shift inhibit time duration $T_{DI}$ is set to zero at the up shift time duration setting section 53 when the vehicle is running on the flat road surface. In this case, when the gear shift control procedure shown in FIG. 13 is executed and the preceding vehicle is decelerated, the inter-vehicle distance L detected by the inter-vehicle distance sensor 12 becomes short.

When the deceleration force margin $F_{DM}$ indicates a negative value and becomes below the down shift threshold value THD, the gear position of the automatic transmission 3 is shifted down from the fourth-speed (OD) gear position so as to augment the deceleration force due to the engine braking.

Therefore, the inter-vehicle distance is recovered to the appropriate value. When the up shift condition is satisfied, the routine shown in FIG. 13 goes to the step SS31 via the steps SS18 through SS20. Since the deceleration force demand value $F_D$ is not reset, the routine goes to the step SS33. However, since the count value N is zero, the decrement by one is carried out at the step SS33 but the routine goes to the step SS21 via the step SS34. Then, at the step SS21, the OD inhibit control signal TS is set to the logical value of "0". t0o shift up the gear position from the third-speed gear position to the fourth-speed (OD) gear position by means of the A/T controller 10.

On the other hand, suppose that the vehicle is running on the flat road surface with the gear position shifted down to the third-speed gear position and the trap of the preceding vehicle by means of the inter-vehicle distance sensor 12 becomes impossible due to the right or left turn of the vehicle or due to a pass of the vehicle through one of the corners in the hair pin curves. In this case, since the sufficient inter-vehicle distance L is given with respect to the target inter-vehicle distance L*, the up shift condition is satisfied and a system including the model matching compensator 51A, the robust compensator 51C, and the deceleration force margin calculating section 52 is reset.

Hence, the target driving force F* outputted from a subtractor 51B indicates zero and the deceleration force demand value FD from the deceleration force margin calculating section 52 is reset to "0".

Since the up shift condition is satisfied at a timing at which the gear shift control procedure of FIG. 13 is executed, the routine goes to the step SS31 via the steps SS18 through SS20. Since the deceleration force demand value FD is reset to "0", the routine goes to the step SS32 for the inhibit counter to be reset to the up shift inhibit time duration $T_{UI}$.

In addition, since "0" is continued even if decremented at the step SS33 is carried out, the routine goes to the step SS21 in which the OD inhibit control signal TS having the logical value of "0" is outputted to the A/T controller 10 so that the gear shift position of the automatic transmission 3 is recovered to the fourth-speed (OD) gear position from the third-speed gear position.

However, in a case where the vehicle is running on the steep gradient descending slope having the great number of corners, the disturbance estimated value dv^ indicates the large value. In accordance with the magnitude of the disturbance estimated value $T_{UI}$ set at the up shift time duration setting section 53 indicates the large value in accordance with the descending slope gradient.

Therefore, if the preceding vehicle turns the corner at the timing at which the gear shift control procedure in FIG. 13 is executed and the preceding vehicle cannot trap the preceding vehicle through the inter-vehicle distance sensor 12, the up shift condition is satisfied in the same manner as the case of the flat road surface and the deceleration force demand value FD which is outputted from the low pass filter 51a at the deceleration force margin calculating section 52 is reset to ""0""

Hence, since the inhibit counter is preset to the preset value which corresponds to the up shift inhibit time duration $T_{UI}$, the routine goes to the step SS33.

Even if the count value of N is decremented, the count value of N provides considerably larger value than zero. Hence, the routine shown in FIG. 13 goes to the step SS34 and, thereafter, is directly ended.

Since the inhibit control signal TS continues the state of the logical value of "1", the automatic transmission 3 is continued at the gear state of the down shift to the third-speed gear position.

Since the deceleration force demand value FD is not reset from the subsequent timer interrupt period, the decrement of the count value N at the step S33 is continued. When the preceding vehicle is trapped by means of the inter-vehicle distance sensor 12 before the up shift inhibit time duration TUI is passed, the deceleration force margin is reduced below the down shift threshold value THD. Since the timer interrupt process is directly ended from the step SS18 in FIG. 13, the control signal TS is maintained at the logical value of "1" and the automatic transmission 3 maintains the down shift state with the automatic transmission 3 at the third-speed gear position.

Thereafter, when the vehicular running state enters the state in which the up shift condition is satisfied, the routine shown in FIG. 13 goes from the step SS31 to the step SS33.

The decrement processing of the count value N is continued. If the vehicular running state does not become a state in which the preceding vehicle cannot be trapped until the count value N reaches to zero, the routine shown in FIG. 13 goes to the step SS21 at a time point at which the count value of N indicates zero. At the step S21, the inhibit control signal TS is returned to the logical value of "0" and the automatic transmission 3 is returned to the fourth-speed (OD) gear position.

As described above, in the third embodiment, the vehicle is running on the steep descending slope having many hair pin curves to follow up the preceding vehicle and the vehicle cannot trap the preceding vehicle through the inter-vehicle distance sensor 12 with which the vehicle is equipped, the deceleration force demand value $F_D$ is reset. Even if the vehicle enters the state under which the up shift condition is satisfied, the up shift is inhibited until the up shift inhibit time duration $T_{UI}$ set in accordance with the descending slope has passed. Consequently, the prevention of the gear shift hunting phenomenon can be assured and no disagreeable feeling is given to the vehicular driver.

In addition, since the up shift inhibit time duration $T_{DI}$ is set in proportion to the magnitude of the descending slope gradient, the vehicle can run through the corner in the descending slope which is steep and is easy for the gear position of the automatic transmission 3 to run at a relatively low velocity.

Even if it takes a long time to trap again the preceding vehicle, the up shift operation of the A/T can be prevented and the prevention of the gear shift hunting can be assured.

Although, in the third embodiment, the preset value corresponding to the up shift inhibit time duration $T_{UI}$ is preset to the inhibit counter at the gear shift control procedure in the gear shift position determining section 54, the count of the inhibit counter may be started at a time point at which the deceleration force margin FD is reset and whether the count value has reached to a value corresponding to the up shift inhibit time duration TUI may be determined.

In addition, in place of the inhibit counter, a software timer may be used to determine if the up shift inhibit time duration has elapsed.

Furthermore, in the third embodiment, the functions of the up shift inhibit time setting section 53 and the gear shift position determining section 54 are individually and separately performed. However, these functions may integrally be performed together with the deceleration force margin calculating section 52. Or alternatively, the calculations at the sections 53, 54, and 55 may be included in the inter-vehicle distance controlling section 40 and the vehicular velocity controlling section 50.

The other advantages in the case of the third embodiment and modifications in the case of the second or third embodiment are the same as those described in the case of the first embodiment.

It is noted that the logical value of "1" of the OD inhibit control signal CS shown in FIG. 9 means that the inhibit of the up shift from the third-speed gear position (corresponds to a lower speed gear position) to the fourth-speed (OD) gear position, the logical value of "0" of the OD inhibit control signal CS shown in FIG. 9 means that the recovery (return) from the third-speed gear position to the fourth-speed (OD) gear position is enabled, the logical value of "1" of the shift control signal TS shown in FIG. 10 means that the OD (Over Drive) is cancelled so that the down shift from the fourth-speed (OD) gear position to the third-speed gear position is carried out, and the logical value of "0" of the shift control signal TS shown in FIG. 10 means that the OD becomes active (recovered) so that the up shift after the down shift is carried out from the third-speed gear position to the fourth-speed (OD) gear position.

The entire contents of Japanese Patent Applications No. Heisei 11-140717 and 11-140718 (both filed in Japan on May 20, 1999) are herein incorporated by reference. Although the invention has been described above by reference to certain embodiments of the invention, the invention is not limited to the embodiments described above. Modifications and variations of the embodiments described above will occur to those skilled in the art in the light of the above teachings. The scope of the invention is defined with reference to the following claims.

What is claimed is:

1. A vehicular velocity controlling apparatus, comprising:
    an inter-vehicle distance detector to detect an inter-vehicle distance from a host vehicle to a preceding vehicle which is running ahead of the host vehicle;
    a target vehicular velocity calculating section that calculates a target vehicular velocity to make a detected value of the inter-vehicle distance substantially equal to a target inter-vehicle distance;
    a vehicular velocity detector to detect a vehicular velocity of the host vehicle;
    a target vehicular driving force calculating section that calculates a target vehicular driving force to make a detected value of the vehicular velocity substantially equal to the target vehicular velocity;
    a road surface gradient detector to detect a gradient of a descending slope on which the host vehicle is running; and
    a vehicular velocity controlling section that controls a driving force exerted by a rotary driving force source and a gear position of a vehicular transmission and controls a brake force exerted by a vehicular brake system if the target vehicular driving force is negative, the vehicular velocity controlling section including a gear position shift limiter to place a limitation on a shift of the gear position of the vehicular transmission even under an establishment of a gear position shift condition in accordance with the road surface gradient detected by the road surface gradient detector, wherein the gear position shift limiter of the vehicular velocity controlling section includes: a deceleration force margin calculator to calculate a deceleration force margin $F_{DM}$ on the basis of the target vehicular driving force; a shift threshold value setting section that sets a shift threshold value with reference to which the shift of the gear position of the vehicular transmission is to be made in accordance with the magnitude of the detected gradient of the descending slope on which the host vehicle is running; and a gear shift position determining section to determine the gear position of the vehicular transmission to which the present gear position is shifted on the basis of the deceleration force margin and the shift threshold value.

2. A vehicular velocity controlling apparatus as claimed in claim 1, wherein the shift threshold value setting section includes a down shift threshold value setting section that sets a down shift threshold value with reference to which a down shift from a higher speed gear position to a lower speed gear position is to be made in such a manner that as a magnitude of the detected road surface gradient becomes larger, the down shift of the gear position of the vehicular transmission easier to make a timing of the down shift in the vehicular transmission earlier than usual when the detected gradient of the slope gradient is substantially zero.

3. A vehicular velocity controlling apparatus as claimed in claim 1, wherein the road surface gradient detector includes a road surface gradient estimator to estimate the road surface gradient of the descending slope from the detected value of the vehicular velocity and a disturbance estimated value estimated according to the target vehicular driving force.

4. A vehicular velocity controlling apparatus as claimed in claim 1, wherein the threshold value setting section further includes an up shift threshold value setting section that sets an up shift threshold value with reference to which an up shift from the lower speed gear position to the higher speed gear position is to be made in such a manner that as a magnitude of the detected road surface gradient of the descending slope becomes larger, an up shift operation after the down shift operation occurs becomes more difficult so as to make an up shift operation of the vehicular transmission later than the usual.

5. A vehicular velocity controlling apparatus as claimed in claim 4, wherein the gear shift position determining section comprises: a present gear position determinator to determine whether the present gear position of the vehicular transmission is placed at a fourth-speed (OD) gear position or at a third gear position according to a logical value of an Over Drive signal in the vehicular transmission; a first comparator to compare the deceleration force margin $F_{DM}$ with the down shift threshold value $TH_D$ when the present gear position is placed at the fourth-speed (OD) gear position to determine whether the deceleration force margin is equal to or greater than the down shift threshold value $TH_D$; a second comparator to compare the relative velocity $\Delta V$ with zero when the first comparator determines that $F_{DM} \geq TH_D$ to determine whether the relative velocity $\Delta V$ is equal to zero or negative; and an OD cancel signal generator to generate and output an OD cancel signal having a logical value of "1" to the vehicular transmission to shift the fourth-speed (OD) gear position down to the third-speed gear position when the second comparator determines that $\Delta V \leq 0$.

6. A vehicular velocity controlling apparatus as claimed in claim 5, wherein the gear shift position determining section further comprises a third comparator to compare the deceleration force margin with the up shift threshold value THU when the present gear position determinator determines that the present gear position is placed at the third gear position; a fourth comparator to compare the relative velocity ΔV with a predetermined relative velocity value ΔVs when the third comparator determines that FDM ≧ THU; a fifth comparator to compare the disturbance estimated value dv^ substantially representing the gradient of the descending slope on which the host vehicle is running with a present gradient value θs when the fourth comparator determines that ΔV≧ΔVs; and an OD recovery signal generator to generate and output the OD cancel signal having a logical value of "0" to an automatic transmission controller to shift the present third-speed gear position up to the fourth-speed (OD) gear position when the fifth comparator determines that dv^ θs.

7. A vehicular velocity controlling apparatus as claimed in claim 6, wherein a characteristic line LD of the down shift threshold value $TH_D$ is such that as the gradient of the descending slope becomes larger, the down shift threshold value becomes smaller from a maximum down shift threshold value $TH_{DMAX}$ set when the detected gradient of the descending slope is approximately zero and a characteristic line LU of the up shift threshold value $TH_U$ is such that as the gradient of the descending slope becomes larger, the up shift threshold value becomes smaller from a maximum up shift threshold value $TH_{UMAX}$ set when the detected gradient of the descending slope is approximately zero, the maximum down shift threshold value being approximately twice larger than the maximum up shift threshold value $TH_{DMAX}$.

8. A vehicular velocity controlling apparatus as claimed in claim 1, wherein the deceleration force margin calculator subtracts a maximum deceleration force $F_{DMAX}$ calculated on the basis of the target vehicular velocity from a deceleration force demand value derived on the basis of the target driving force.

9. A vehicular velocity controlling apparatus, comprising:
an inter-vehicle distance detector to detect an inter-vehicle distance from a host vehicle to a preceding vehicle which is running ahead of the host vehicle;
a target vehicular velocity calculating section that calculates a target vehicular velocity to make a detected value of the inter-vehicle distance substantially equal to a target inter-vehicle distance;
a vehicular velocity detector to detect a vehicular velocity of the host vehicle;
a target vehicular driving force calculating section that calculates a target vehicular driving force to make a detected value of the vehicular velocity substantially equal to the target vehicular velocity;
a road surface gradient detector to detect a gradient of a descending slope on which the host vehicle is running; and
a vehicular velocity controlling section that controls a driving force exerted by a rotary driving force source and a gear position of a vehicular transmission and controls a brake force exerted by a vehicular brake system if the target vehicular driving force is negative, the vehicular velocity controlling section including a gear position shift limiter to place a limitation on a shift of the gear position of the vehicular transmission even under an establishment of a gear position shift condition in accordance with the road surface gradient detected by the road surface gradient detector, wherein the gear position shift limiter of the vehicular velocity controlling section includes: a descending slope gradient running time duration measuring section that measures a time duration for which the host vehicle runs continuously on the descending slope whose gradient is detected by the road surface gradient detector; and an up shift inhibiting section that inhibits an up shift of the gear position from a lower speed gear position to a higher speed gear position of the transmission after a down shift from the higher speed gear position to the lower speed gear position is carried out for an up shift inhibit time duration set in accordance with the measured time duration.

10. A vehicular velocity controlling apparatus as claimed in claim 9, wherein the up shift inhibiting section includes an up shift inhibit time duration setting section that sets the up shift inhibit time duration in accordance with the continuous time duration for which the host vehicle runs on the descending slope whose magnitude of the gradient is equal to or larger than a predetermined descending slope gradient.

11. A vehicular velocity controlling apparatus as claimed in claim 9, wherein the gear shift position limiter of the vehicular velocity controlling section includes a transmission down shift controlling section that controls the down shift of the vehicular transmission when a calculated deceleration force margin is in excess of a predetermined threshold value, the deceleration force margin being calculated from a subtraction of a maximum deceleration force calculated on the basis of the target vehicular velocity from a deceleration force demand value derived on the basis of the target vehicular driving force.

12. A vehicular velocity controlling apparatus, comprising:
an inter-vehicle distance detector to detect an inter-vehicle distance from a host vehicle to a preceding vehicle which is running ahead of the host vehicle;
a target vehicular velocity calculating section that calculates a target vehicular velocity to make a detected value of the inter-vehicle distance substantially equal to a target inter-vehicle distance;
a vehicular velocity detector to detect a vehicular velocity of the host vehicle;
a target vehicular driving force calculating section that calculates a target vehicular driving force to make a detected value of the vehicular velocity substantially equal to the target vehicular velocity;
a road surface gradient detector to detect a gradient of a descending slope on which the host vehicle is running; and
a vehicular velocity controlling section that controls a driving force exerted by a rotary driving force source and a gear position of a vehicular transmission and controls a brake force exerted by a vehicular brake system if the target vehicular driving force is negative, the vehicular velocity controlling section including a gear position shift limiter to place a limitation on a shift of the gear position of the vehicular transmission even under an establishment of a gear position shift condition in accordance with the road surface gradient detected by the road surface gradient detector, wherein the vehicular velocity controlling section further includes: a deceleration force margin calculator to calculate a deceleration force margin from a difference between a deceleration force demand value based on the target vehicular driving force and a maximum deceleration force based on the target vehicular velocity; a shift position determining section that compares the deceleration force margin with a predetermined threshold value to determine a shift position of the vehicular transmission; and an up shift inhibiting section that inhibits an up shift of the gear position from a lower speed gear position to a higher speed gear position of the vehicular transmission after a down shift from the higher speed gear position to the lower speed gear position is carried out from a time point at which the deceleration force command value is reset to a time point at which an up shift inhibit time duration set in accordance with the detected road surface descending slope gradient has elapsed.

13. A vehicular velocity controlling apparatus as claimed in claim 12, wherein the up shift inhibiting section elongates the up shift inhibit time duration as a magnitude of the detected road surface gradient descending slope becomes larger.

14. A vehicular velocity controlling apparatus as claimed in claim 13, wherein the up shift inhibiting section maintains the up shift inhibit time duration at its maximum time duration when the detected road surface gradient descending slope on which the host vehicle is running becomes larger than a predetermined magnitude of the gradient.

15. A vehicular velocity controlling apparatus as claimed in claim 12, wherein the road surface gradient detector includes a road surface gradient estimator to estimate the road surface gradient of the descending slope from the detected value of the vehicular velocity and a disturbance estimated value estimated according to the target vehicular driving force.

16. A vehicular velocity controlling apparatus, comprising:
    inter-vehicle distance detecting means for detecting an inter-vehicle distance from a host vehicle to a preceding vehicle which is running ahead of the host vehicle;
    target vehicular velocity calculating means for calculating a target vehicular velocity to make a detected value of the inter-vehicle distance substantially equal to a target inter-vehicle distance;
    vehicular velocity detecting means for detecting a vehicular velocity of the host vehicle;
    target vehicular driving force calculating means for calculating a target vehicular driving force to make a detected value of the vehicular velocity substantially equal to the target vehicular velocity;
    road surface gradient detecting means for detecting a gradient of a descending slope on which the host vehicle is running;
    vehicular velocity controlling means for controlling a driving force exerted by a rotary driving force source and a gear position of a vehicular transmission and controlling a brake force exerted by a vehicular brake system if the target vehicular driving force is negative, the vehicular velocity controlling means including gear position shift limiting means for placing a limitation on a shift of the gear position of the vehicular transmission even under an establishment of a gear position shift condition in accordance with the road surface gradient detected by the road surface gradient detecting means,
    wherein the gear position shift limiting means of the vehicular velocity controlling means includes: a deceleration force margin calculating means for calculating a deceleration force margin $F_{DM}$ on the basis of the target vehicular driving force; a shift threshold value setting means for setting a shift threshold value with reference to which the shift of the gear position of the vehicular transmission is to be made in accordance with the magnitude of the detected gradient of the descending slope on which the host vehicle is running; and a gear shift position determining means for determining the gear position of the vehicular transmission to which the present gear position is shifted on the basis of the deceleration force margin and the shift threshold value.

17. A vehicular velocity controlling method, comprising:
detecting an inter-vehicle distance from a host vehicle to a preceding vehicle which is running ahead of the host vehicle;
calculating a target vehicular velocity to make a detected value of the inter-vehicle distance substantially equal to a target inter-vehicle distance;
detecting a vehicular velocity of the host vehicle;
calculating a target vehicular driving force to make a detected value of the vehicular velocity substantially equal to the target vehicular velocity;
detecting a gradient of a descending slope on which the host vehicle is running;
controlling a driving force exerted by a rotary driving force source and a gear position of a vehicular transmission and simultaneously controlling a brake force exerted by a vehicular brake system if the target vehicular driving force is negative; and
placing a limitation on a shift of the gear position of the vehicular transmission even under an establishment of a gear position shift condition in accordance with the road surface gradient,
    wherein the placing a limitation on a shift of the gear position of the vehicular transmission includes: calculating a deceleration force margin $F_{DM}$ on the basis of the target vehicular driving force; setting a shift threshold value with reference to which the shift of the gear position of the vehicular transmission is to be made in accordance with the magnitude of the detected gradient of the descending slope on which the host vehicle is running; and determining the gear position of the vehicular transmission to which the present gear position is shifted on the basis of the deceleration force margin and the shift threshold value.

* * * * *